United States Patent
Yacobi et al.

(10) Patent No.: US 6,983,050 B1
(45) Date of Patent: Jan. 3, 2006

(54) METHODS AND APPARATUS FOR PROTECTING INFORMATION CONTENT

(75) Inventors: Yacov Yacobi, Mercer Island, WA (US); Paul England, Bellevue, WA (US); Gideon A. Yuval, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 09/609,019

(22) Filed: Jun. 30, 2000

Related U.S. Application Data

(60) Provisional application No. 60/160,603, filed on Oct. 20, 1999.

(51) Int. Cl.
*H04N 7/167* (2006.01)
*H04B 1/69* (2006.01)

(52) U.S. Cl. ............... 380/210; 380/205; 380/212; 380/213; 375/130

(58) Field of Classification Search ............... 380/210, 380/213, 205, 212; 375/130
See application file for complete search history.

(56) References Cited

U.S. PATENT DOCUMENTS

| 5,841,863 | A | | 11/1998 | Ryan et al. |
| 5,844,988 | A | | 12/1998 | Ryan et al. |
| 6,002,707 | A | * | 12/1999 | Thue ........................... 375/130 |
| 6,486,923 | B1 | * | 11/2002 | Maeshima et al. ......... 348/649 |
| 6,570,990 | B1 | * | 5/2003 | Kohn et al. .................. 380/213 |

OTHER PUBLICATIONS

Graf, Rudolf F., Sheets, William, Video Scrambling & Descrambling for Satellite & Cable TV—Second Edition, 1998, Chapter 1.*

Copy protection for high–definition baseband video, Barr, D.A.; Information Technology: Coding and Computing, 2000. Proceedings. International Conference on , Mar. 27–29, 2000 Page(s):174–177.*

CPTWG—Copy Protection System presentation materials, pp. 1–12, (Dec. 15, 1998).*

5C Digital Transmission Content Protection White Paper, http://www.dtcp.com/data/wp_spec.pdf, Revision 1.0, Jul. 14, 1998.*

(Continued)

*Primary Examiner*—Ayaz Sheikh
*Assistant Examiner*—Brandon Hoffman
(74) *Attorney, Agent, or Firm*—Lee & Hayes, PLLC

(57) ABSTRACT

Methods and apparatus for protecting copyrighted information, e.g., video signals, from unauthorized coping. Analog red (R), green (G) and blue (B) video signals are transmitted from a source device, e.g., a display adapter, to a display device, e.g., a monitor, over corresponding analog signal lines after the identify of the destination device is confirmed by receipt of a certificate assigned to the destination device. A session key, used for encrypting the analog signals, is generated and exchanged between the source and destination devices after the identification of the destination device is confirmed. The source and destination devices each includes a pseudo-random number generator driven by the session key. The lines that carry the R, G and S video signals are changed, e.g., swapped, on a periodic basis as a function of the output of the pseudo-random number generator in the source device. The destination device, which has an input to its pseudo-random number generator synchronized with the random number generator of the source device, decrypts the received video signals in a complimentary fashion to the encryption. Encrypted digital information subject to copying constraint may be supplied to a display adapter via an IEEE 1399 compliant bus.

14 Claims, 11 Drawing Sheets

OTHER PUBLICATIONS

Video Scrambling & Descrambling for Satellite & Cable TV—Second Edition, Graf, Rudolf F., Sheets, William. 1998, chapter 1.*

"Enhance Display Data Channel Proposed Standard", VESA E–DDC Proposed Standard, Version 1P, Draft 8, pp. 1–22, Jul. 13, 1999.

"Enhanced Extended Display Identification Data Proposal", VESA EEDID Proposal, Release A, Draft 11, pp. 1–35, Jul. 13, 1999.

CPTWG—Copy Protection System presentaton materials, pp. 1–12, (Dec. 15, 1998).

"Generalized Timing Formula (GTF™) Standard", VESA GTF Standard, Version 1.0, Revision 1.0, pp.i–27, Adoption Date: Dec. 18, 1996.

"SMPTE Standard for Television, Audio and File—Time and Control Code", ANSI/SMPTE 12M–1995, pp. 1–19, Sep. 12, 1995.

* cited by examiner $$\begin{bmatrix} R' \\ G' \\ B' \end{bmatrix} = \begin{bmatrix} -1 & 0 & 0 \\ 0 & 1 & 0 \\ 0 & 0 & 1 \end{bmatrix} \begin{bmatrix} R \\ G \\ B \end{bmatrix}$$

METHODS AND APPARATUS FOR PROTECTING INFORMATION CONTENT

RELATED APPLICATIONS

This application claims the benefit of U.S. Provisional Application No. 60/160,603, filed Oct. 20, 1999.

FIELD OF THE INVENTION

The present invention relates to methods and apparatus for transmitting and storing information and, more particularly, to methods and apparatus for discouraging, and/or protecting against, the unauthorized copying or use of the content of transmitted and/or stored information, e.g., video and/or audio signals.

BACKGROUND OF THE INVENTION

Currently, video continues to grow in importance. Video is now used for entertainment, business and educational purposes.

Consumer electronics (CE) devices such as digital video disks (DVDs), video cassette recorders, televisions, etc. are frequently used to record and/or playback video information. While many current CE video devices are analog devices such as VHS VCRs, as the cost of digital media and digital players, such as DVD players, decreases, digital CE devices are likely to replace many of the analog devices presently in use.

Theft of copyrighted information, e.g., commercial videos, is a major problem. In order to discourage the copying of, e.g., analog video cassettes, many video distributors, intentionally insert noise, as a "copy protection" scheme, into a synchronization portion of the recorded signal. While this noise normally does not significantly effect the viewing of the original cassette, copying of such cassettes using conventional VCRs tends to produce a copy that contains an annoying amount of flicker. The flicker results from inaccuracies associated with the copying process through which the noise included in the synchronization signal is much more noticeable in the copy than in the recording being copied.

Such known copy protection schemes tend to work reasonably well with current analog VCRs and television sets because such sets are designed to work with a synchronization signal that is relatively noise-free.

While CE devices are tending towards all digital embodiments, analog interfaces with computer monitors are likely to be favored over digital interfaces for quite some time. Generally, for a digital signal to accurately represent an analog video-signal, the sampling rate of the digital signal must be at least twice the highest frequency component of the analog signal being represented. Accordingly, to accurately represent high frequency analog video signals, extremely high sampling rates and digital signal processing rates must be supported.

Because of the high signal processing rates that must be supported by digital monitors to display comparable video signals applied to an analog monitor, analog signal processing circuitry included in display devices has tended to be less expensive to implement than digital circuitry. For this reason, among others, analog video signals have generally been preferred to digital video signals for monitor/computer connections. Analog video signals, e.g., VGA signals, usually include, red (R), green (G), blue (B) color signals, horizontal synchronization (HS) signal, and vertical synchronization (VS) signals. Analog interconnects for such signals, e.g., monitor cables, generally include at least one line for each of the R, G, B, HS, and VS signals and at least one line for monitor plug-and-play (PP) signals. Two PP lines are common. A nine pin DB-9 connector has become a common connector for connecting analog monitors, e.g., VGA monitors, to computer graphics cards and adapters.

Today, many computer monitors are analog "multi-sync" monitors. Such monitors are designed to automatically synchronize to a plurality of signals of different frequencies. Because such computer monitors are designed to handle synchronization signals of multiple frequencies, they are far more flexible than conventional television sets at handling noise and/or slight frequency affects in synchronization signals. For this reason, conventional analog video copy protection techniques, such as that described above, are generally ineffective when applied to video signals supplied to analog multi-sync computer monitors.

In addition to DVDs, digital high definition televisions are likely to become common in the next few years as digital television broadcasts begin and the price of digital television sets decreases.

In order to reduce the risk of unauthorized copying of copyrighted works, several companies, including Hitachi, Ltd., Sony; Intel, and others have proposed an industry standard for digital consumer electronics devices which involves the use of authentication and key exchange procedures along with data encryption and the use of a digital communication bus which complies with IEEE standard 1394. The bus is sometimes referred to as "1394 Firewire". The proposed standard, hereinafter referred to as the "SC Standard", is discussed in the *5C Digital Transmission Content Protection White Paper*, Revision 1.0, dated Jul. 14, 1999.

The 5C standard includes several features. Four such features are:

(1) Copy control requests—A source device can request a destination device to honor copy control requests including copy-never, copy-free, and copy-once requests.

(2) Use of certificates—A destination device proves its trustworthiness to a source device by presenting a digital certificate, e.g., an authentication key, and using a corresponding private key for communications with the source device. The certificate is issued by a certifying authority that has examined the destination device to determine that it will honor the 5C standard copy control requests.

(3) A key exchange protocol—The protocol is used by the source and destination devices once the destination device has proved that it is certified to establish a session key (content encryption key) used for encrypting copyrighted information to be exchanged.

(4) Transmission of copyrighted information in encrypted form—Information subject to copy restriction requests is transmitted in encrypted form using the session key.

In the proposed standard, a central authority is responsible for reviewing and certifying devices as complying with 5C standard copy control requests.

FIG. 1 illustrates conventional device 100 for implementing the 5C Standard. Device 100 includes authentication and key exchange subsystem 116, optional system renewal subsystem 114, content cipher subsystem 120, IEEE 1394 bus interface 118, storage device 112 for storing video data to be transmitted as well as received video data, and digital bus 122 which is 1394 compliant.

In this system, authentication messages, system renewal messages, authentication keys, exchange keys and session keys, in addition to encrypted data, are passed between the system 100 and other devices via the bus 122. Interface 118 is responsible for electrically interfacing between bus 122 and system elements, such as authentication and key exchange subsystem 116 content cipher subsystem 120. The authentication and key exchange subsystem 116 receives and exchanges, via bus 122, authentication and key information as well as system renewal messages. The content cipher subsystem 120 is responsible for encrypting video information prior to transmission and decoding received encrypted information using content keys provided by authentication and key exchange system 116, to the cipher subsystem 120.

Storage 112 stores un-encrypted video data, copyright status and system renewal information. The system renewal and copyright status information is provided to authentication and key exchange subsystem 116. The video residing in the storage device 112 is supplied to, or received from, the content cipher subsystem 120 which is responsible for encoding/decoding video information passed over bus 122.

In the conventional device, copy protection status information is included in an initial transmission of data between devices along with authentication information, e.g., authentication keys. Copy protection status information indicates that encrypted data can be copied freely, copied for one generation (copy-one-generation), never copied (copy-never) or is subject to a no more copies constraint (no-more-copies). An authentication key is established during authentication, which occurs at the beginning of each exchange of encrypted information between source and destination devices. The authentication key is used to encrypt an exchange key. The exchange key is used to establish and manage security of copyrighted content streams. A content (session) key is exchanged between source and destination devices in conventional device 100. The content key is used to encrypt/decrypt the content being exchanged. Authentication and key exchange subsystem 116 provides the content key, associated with a particular communication, to content cipher subsystem 120 for use in encoding/decoding the content being transmitted or received.

The 5C Standard was designed primarily for digital CE devices. A housing of such devices can normally be sealed in such a manner as to make access to the inside of the device difficult—particularly since consumers rarely need access to the insides of devices such as television sets and VCRs. Furthermore, an amount of control a consumer can have over the data processing performed by most CE devices can be limited to a set of preselected operations, e.g., play, reverse, stop, etc.

Computer owners are accustomed to having easy access to internal components of their systems for upgrading and component replacement purposes. Accordingly, in most cases it would be unacceptable to seal computer housings in such a manner as to deny the owner easy access to internal components of his (her) computer system. In addition, one strength of a personal computer is that it can run arbitrary programs that can interact at a low-level with computer hardware and an operating system. Practically, this means that if unencrypted bits flow through a computer system, often a process can be crafted to steal, e.g., copy, them.

For this reason, computers generally raise more concerns with regard to potential pirating of copyrighted information than e.g., televisions and other CE products. Because of the ease with which copyrighted data can be copied by computer systems, it is unlikely that computer systems, e.g., personal computers (PCs), are likely to be certified as devices which implement the 5C Standard copy control requests with sufficient certainty to support issuance to it of a 5C certificate. Without such a certificate, a device will be unable to interact and exchange copyrighted information subject to copy constraints with 5C Standard CE devices. The likely inability for a computer system, as a whole, to be certified as a 5C Standard compliant device poses the threat that, in the future, computer systems will be unable to interface with many CE devices.

Another threat to computer system and CE device interoperability has been created by the film industry. A least one major film studio has threatened to refuse licensing high-resolution video if such video will be transmitted on unencrypted analog interconnects.

If copyright owners maintain such a position, it would preclude computer devices from transmitting HDTV to monitors using unencrypted analog lines. The purpose of this 5C Standard is to secure upcoming high-resolution video formats by making it difficult for individuals to connect recorders into the analog stream between a video player and the monitor. A problem with this standard is that it will increase the costs of monitors and video cards.

Unfortunately, an inability to receive certification for a computer system as 5C compliant would prevent that system from displaying copy retrieved movies and other high definition video content where the video is transmitted to a monitor using conventional unencrypted analog monitor interconnects.

In view of the above discussed threats to computer system/CE device interoperability, a need now exists for methods and apparatus that would allow a computer system, or at least a portion of a computer system, to interface and exchange data with 5C Standard devices subject to copy restrictions. In addition, a need also exists for methods and apparatus of implementing some form of encryption or scrambling of video signals on analog interconnects to address concerns of copyright owners regarding unauthorized copying of analog signals. From a commercial standpoint, it is desirable that any new methods and apparatus be at least somewhat backward compatible and be capable of being implemented at a reasonable cost.

SUMARY OF THE PRESENT INVENTION

The present invention is directed to methods and apparatus for preventing the unauthorized copying or use of the content of transmitted and/or stored information, e.g., video and/or audio signals. As discussed above, it is unlikely that computer systems, as a whole, will be able to qualify for and obtain certificates indicating 5C Standard compliance.

To partially counter this difficulty, one feature of the present invention is directed to rendering at least one component of a computer system capable of obtaining a 5C certificate thus allowing that component to interact with 5C Standard compliant devices.

In accordance with our specific inventive teachings, a display adapter, e.g., an MPEG video card, is rendered 5C Standard compliant, hence forming a "secure video card". This adapter includes an interface for coupling the card to a digital bus, e.g., 1394 Firewire, used to couple 5C standard devices such as a DVD player, to other 5C Standard compliant devices. The interface of the secure video card is also coupled to a bus within the computer system. However, to guard against unauthorized copying of copyrighted information subject to 5C Standard copyright restrictions, such information is only allowed to be passed external to the video card, e.g., to a hard disk for storage, in encrypted form. A content encryption key is maintained on the secure video card, thereby precluding decoding of the encrypted data, once stored, or its copying.

In this manner, a video card can qualify for a SC certificate and the computer system incorporating the video card can be used to receive, copy, distribute and, in some cases, display copyrighted content subject to 5C Standard copy restrictions.

Our inventive secure video card is designed to be tamper-resistant and to prevent easy access to unencrypted signals, e.g., it may be coated with an epoxy material. Processing of the copyrighted information subject to the 5C Standard copyright constraints, in unencrypted form, is restricted, to occurring just on the card in this way, many of the concerns copyright owners harbor concerning information being stolen, as the result of processing by the main CPU of a PC, can be avoided.

In addition to addressing 5C Standard compliance issues, our present invention addresses the concerns some copyright owners have regarding the transmission of video signals over analog lines.

In accordance-with our inventive teachings, analog video signals are transmitted from a source device, e.g., a video adapter, to a destination, e.g., display device such as, a monitor, over a plurality, e.g., three, video signal lines. Prior to transmitting information to the destination device, the identity of the destination device is confirmed via receipt, by the source device, of a certificate, e.g., authentication key, assigned to the destination device by a central authority. A session key, used as a content encryption key, is then generated and exchanged between the source, and destination devices. The source and destination devices each includes a pseudo-random number generator that is driven by the session key. The three video signal lines, which are, used to transmit the red, green and blue analog video signals, are changed, e.g., swapped, on a periodic basis as a function of the output of the pseudo-random number generator in the source device. In one embodiment, the red, green and blue signals are also altered, e.g., encrypted, by multiplying signal values by coefficients produced by the pseudo-random number generator thereby frustrating any decoding of these video signals by detecting correlations among the signal values. An input to the pseudo-random number generator in the destination device is synchronized with the random number generator in the source device via the exchange of session keys. The number generator in the destination device drives a decryption circuit which performs an inverse swapping and multiplying operation to that performed by the source device, thereby re-generating the analog red, green and blue color signals. In this manner, the video signals received on the three analog lines can be properly recombined to form proper red, green and blue video signals.

Our inventive video adapter can detect when it is coupled to a display device when the latter is also implemented in accordance with our present invention. When connected to a conventional display device, e.g., a monitor, the video adapter limits its display output to non-encrypted analog video signals which do not include information subject to a restriction precluding transmission over unencrypted analog transmission lines. When connected to a display device that has been implemented in accordance with the present invention, the video adapter generates encrypted analog video signals and periodically exchanges a session key with the display device, which, in turn, is used for decoding the transmitted video signals. Thus, our inventive display adapter provides some degree of backwards compatibility in that it can be used with existing monitors and with new display adapters that embody our present invention. In addition, since the display adapter can be added to conventional computer systems, e.g., in place of conventional display adapters, our inventive adapter provides a way of adding 5C Standard compatibility and new display features, but with very few modifications, to an existing computer system.

BRIEF DESCRIPTION OF THE DRAWINGS

The teachings of the present invention can be readily understood by considering the following detailed description in conjunction with the accompanying drawings, in which:

FIG. 7 illustrates a matrix multiplication operation that may be used to encrypt video signals in accordance with one exemplary embodiment of the present invention.

DETAILED DESCRIPTION

As discussed above, the present invention is directed to methods and apparatus for preventing the unauthorized copying or use of the content of transmitted and/or stored information, e.g., video and/or audio signals.

Those skilled in the art will recognize that the present invention may be effected by a wide range of devices, other than just a personal computer (PC), and particularly, specific circuitry therein. Program modules that incorporate our inventive teachings may include routines, programs, objects, components, data structures, etc. that perform a task(s) or implement particular abstract data types. Moreover, those skilled in the art will appreciate that at least some aspects of the present invention may be practiced with other configurations, including hand-held devices, multi-processor systems, microprocessor-based or programmable consumer electronics, network computers, minicomputers, set-top boxes, mainframe computers, displays used in, e.g., consumer electronics applications, automotive, aeronautical, industrial applications, and the like. At least some aspects of the present invention may also be practiced in distributed computing environments where tasks are performed by remote processing devices linked through a communications network. In a distributed computing environment, program, modules may be located in local and/or remote memory storage devices. Nevertheless, to facilitate understanding, we will discuss our invention in the context of various embodiments that would be used in a PC environment.

Figure 2:
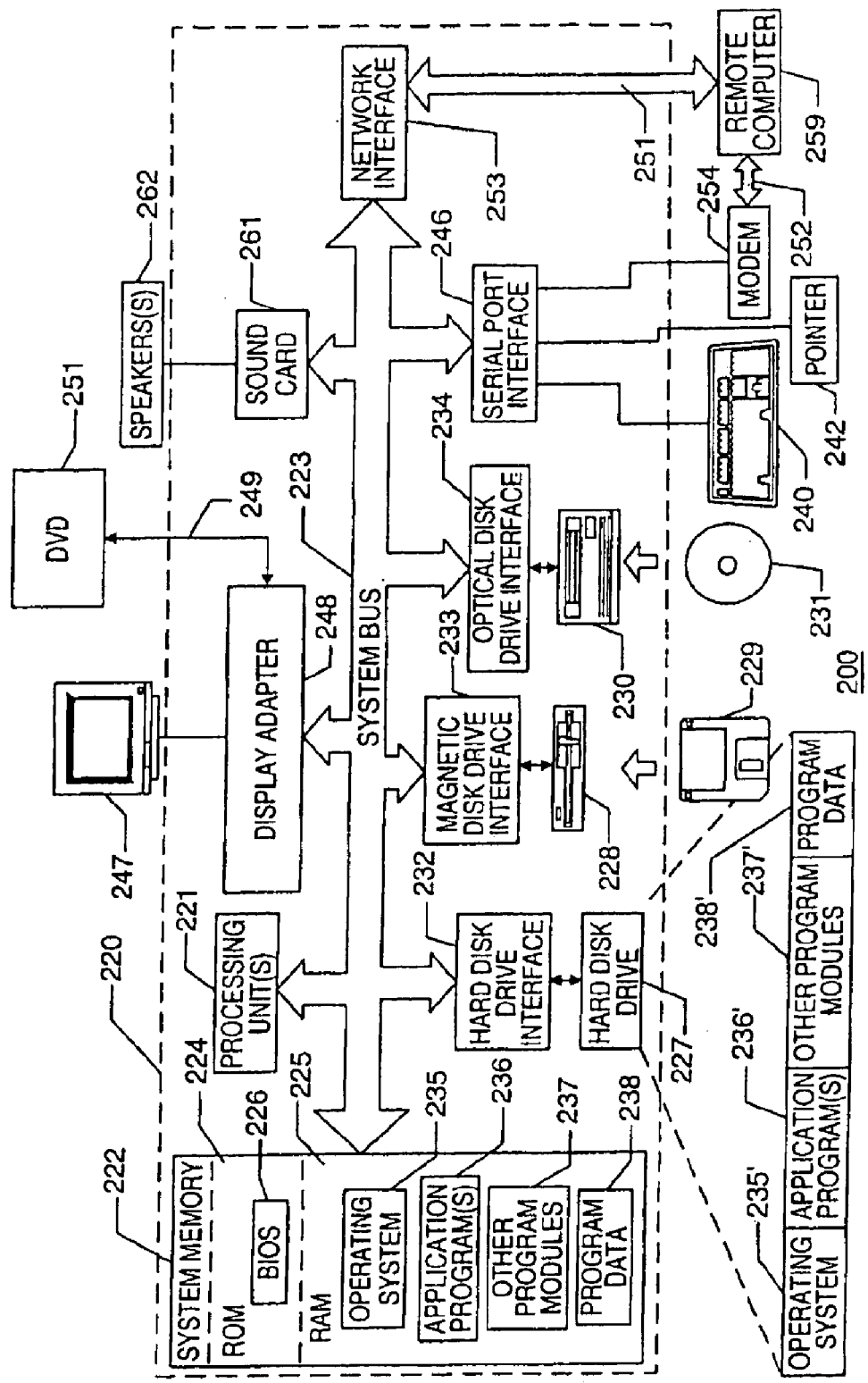
FIG. 2 illustrates a computer system implemented in accordance with one embodiment of our present invention.

FIG. 2 and the following discussion provide a brief, general description of an exemplary apparatus in which at least some aspects of the present invention may be implemented. Various methods of the present invention will be described in the general context of computer-executable instructions, e.g., program modules, being executed by a computer device such as computer system 220 or display adapter 248. Other aspects of the invention will be described in terms of physical hardware such as, e.g., display adapter circuits and display device components.

System 200 includes general purpose computing device 220 taking the form of, e.g., a PC. PC 220 may include processing unit 221, system memory 222 and system bus 223 that couples various system components including the system memory to Processing unit 221. system bus 223 may be any of several types of bus structures including memory bus or memory controller, a peripheral bus, and a local bus using any of a variety of bus architectures. The system memory may include read one memory (ROM) 224 and/or random access memory (RAM) 225. Basic input/output system 226 (BiOS), including basic routines that transfer information between elements within PC 220, such as during start-up, may be stored in ROM 224. PC 220 may also include hard disk drive 227 for reading from and writing to a hard disk (not shown), magnetic disk drive 228 for reading from or writing to (e.g., removable) magnetic disk 229 and optical disk drive 230 for reading from or writing to removable (magneto) optical disk 231, such as a compact disk or other (magneto) optical media. Hard disk drive 227, magnetic disk drive 228 and (magneto) optical disk drive 230 may be coupled with system bus 223 through hard disk drive interface 232, magnetic disk drive interface 233 and a (magneto) optical drive interface 234, respectively. The drives and their associated storage media provide nonvolatile storage of machine readable instructions, data structures, program modules and other data, e.g., video data. Although the exemplary environment described herein employs a hard disk, a removable magnetic disk and a removable optical disk, those skilled in the art will appreciate that other types of storage media, such as magnetic cassettes, flash memory cards, digital video disks, Bernoulli cartridges, random access memories (RAMs), read only memories (ROM), and the like may be used instead of, or in addition to, the storage devices introduced above.

A number of program modules may be stored on hard disk 223, magnetic disc 229, (magneto) optical disk 231, ROM 224 or RAM 225, such as, e.g., operating system 235, one or more application programs 236, other program modules 237 and/or program data 238. A user may enter commands and information into PC 220 through input devices, such as, e.g., keyboard 240 and pointing device 242. Other input devices (not shown) such as a microphone, joystick, game pad, satellite dish, Scanner, or the like may also be included. These and other input devices are often connected to the processing unit through serial port interface 246 coupled to the system bus 223. However, input devices may be connected by other interfaces, such as a parallel port, a game port or a universal serial bus (USB)—all of which are not shown.

A display device, e.g., monitor 247, implemented in accordance with the present invention is connected to system bus 223 via an interface, such as inventive display adapter 248. In addition to being coupled to monitor 247 and system bus 223, display adapter 248 is coupled to external DVD player 251 via IEEE 1394 standard digital data bus, e.g., 1394 Firewire 249. Video adapter 223 can receive encoded video via bus 249 or unencoded video via, e.g., system bus 248. Bus 249 connects video adapter 248 directly to 5C Standard compliant CE devices without having to pass encrypted information from a CE device through other computer system components.

As will be discussed below, monitor 247 is capable of interacting and exchanging identification certificates (authentication keys) and session keys, in accordance with the present invention, with video adapter 248.

In addition to monitor 247, PC 220 may include other peripheral output devices (not shown), such as, e.g., printers. PC 220 may include a sound card 261 and speakers 261.

PC 220 may operate in a networked environment which defines logical connections to one or more remote computers, such as remote computer 259. Remote computer 259 may be another PC, a server, a router, a network computer, a peer device or other common network node, and may include many or all of the elements described above relative to PC 220. The logical connections depicted in this figure include local area network (LAN) 251 and wide area network (WAN) 252, which may comprise, e.g., an intranet and Internet, respectively.

When used in a LAN, PC 220 may be connected to LAN 251 through network interface card (adapter) ("NIC") 253. When used in a WAN, such as the Internet, PC 220 may include modem 254 or other means for establishing communications over the wide area network. The modem, which may be internal or external, may be connected to system bus 223 via serial port interface 246. In a networked environment, at least some of the program modules depicted relative to PC 220 may be stored in the remote memory storage device. The network connections shown are exemplary and other means of establishing a communications link between the computers may be used.

Figure 3:
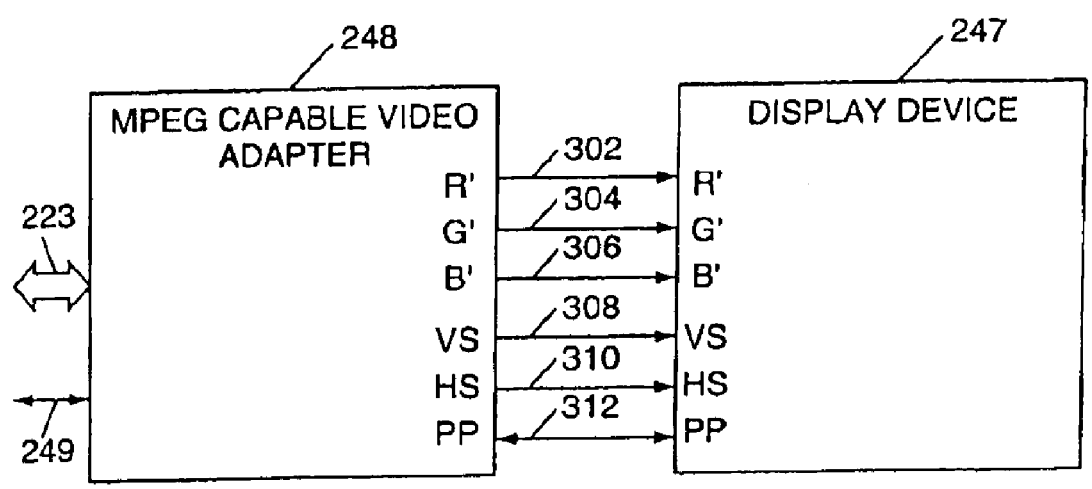
FIG. 3 illustrates a display adapter and display device coupled together in accordance with our present invention.

FIG. 3 illustrates display adapter 248 and display device 247, shown in FIG. 2, embodiment coupled together in accordance with the present invention. As illustrated, video adapter 248 can receive input from either system bus 223 or 1394 Firewire 249. In addition, video adapter 248 can receive monitor identification and video decoding synchronization information from display device 247 via one or more plug and play (PP) lines 312.

Video adapter 248 can supply video information to display device 247 over a plurality of analog lines, here color signal lines 302, 304, 306; vertical synchronization (VSI signal line 308, and horizontal synchronization (HS) signal line 310. Lines 302, 304, 306, 308, 310, 312 are typically part of a single multi-wire cable having a conventional DB-9 end connection for plugging into a corresponding DB-9 connector included in an I/O interface of video adapter 248. As the result of the use of a conventional connector and pin-out arrangement, the video adapter can be connected to a conventional, e.g., VGA, monitor, or monitor 247 capable of supporting encryption.

Figure 4:
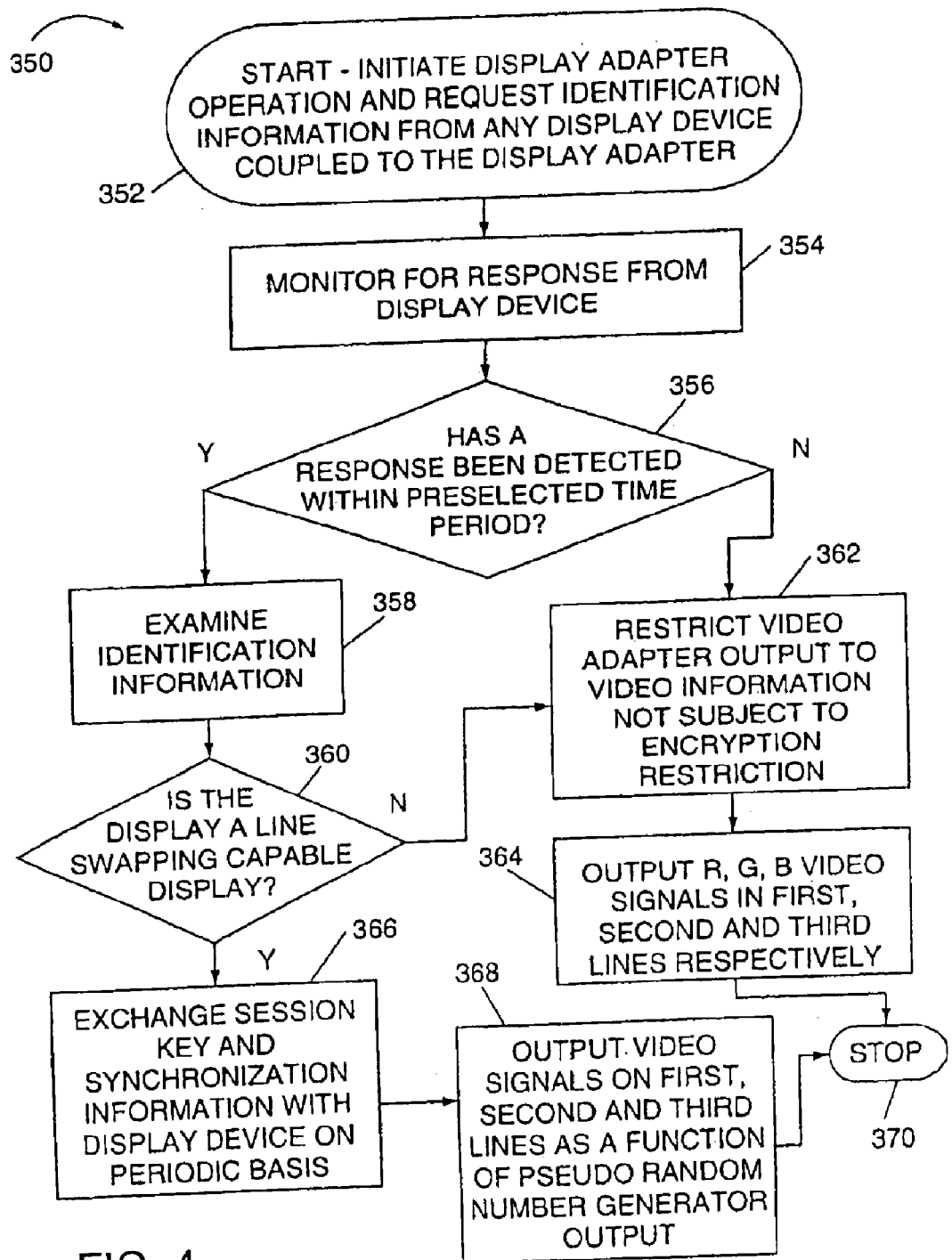
FIG. 4 depicts a flow chart illustrating the operation of our inventive display adapter.

FIG. 4 depicts flow chart 350 illustrating the operation of our inventive display adapter 248.

As shown, upon power up or re-initialization, operation of display adapter 246 begins in step 352 wherein the display adapter 248 polls any display device, coupled thereto, to request monitor identification information. The polling may be done by transmitting a request for monitor identification information to the device on any one of the lines 302, 304, 406, 308, 310 or 312 and then waiting for a response from the display device via one or both of PP lines 312.

Hence, after transmitting a request for identification information, display adapter 248 monitors, in step 354, the lines 312 for a response from the display device.

If a response to the request is not received in a preselected amount of time (a "timeout" interval), e.g., 1second, as determined by decision step 356, display adapter 248 assumes that it is connected to a conventional analog display device, e.g., VGA monitor. Operation then proceeds to step 362. Through step 362, display adapter 248 restricts video output via the those analog lines (302, 304 and 306, as shown in FIG. 3) to video information which is not subject to a restriction prohibiting transmission of that information over unencrypted analog lines. From step 362 shown in FIG. 4, operation proceeds to step 364 wherein the lines 302, 304, 306 are used as R, G, and B analog video lines respectively, with analog video information being transmitted over these three lines to display device coupled to display adapter 248.

Video output occurs in step 364 until the system is reset or power is turned off causing, in step 370, operation of the display adapter to stop.

If, in step 356, a response to the request for display device identification information is detected within the timeout interval, then operation proceeds to step 358 wherein the identification information is examined. The identification information may be the same as or similar to the type used in the 5C Standard and include a digital certificate used to confirm the identity of the display device.

If the examination reveals, as determined by decision step 360, that the display device, coupled to adapter 248 is not an encryption capable device, operation proceeds, via step 360, to step 362.

However, if the examination instep 358 reveals that the display device is a line swapping capable device, operation proceeds, via step 360, to step 366. This latter step periodically exchanges session key and synchronization information with the display device. This may involve, for example, the display adapter transmitting synchronization and session key information to display device 247 on one or all of the signals appearing on signal lines 302, 304, 306 during a vertical blanking period.

With the exchange of a session key, display adapter 248 is ready to produce encrypted analog video signals on signal lines 302, 304, 306 which connect display adapter 248 to display 247. These signals are produced and applied to display device 247 through step 368. The periodic exchange of session key and synchronization information, as well as the supply of encrypted video signals to display 247, which occur in steps 366 and 368, continues until operation of display adapter 248 or display device 247 halt in step 370, e.g., due to power being turned off or a re-set operation being performed.

Figure 5:
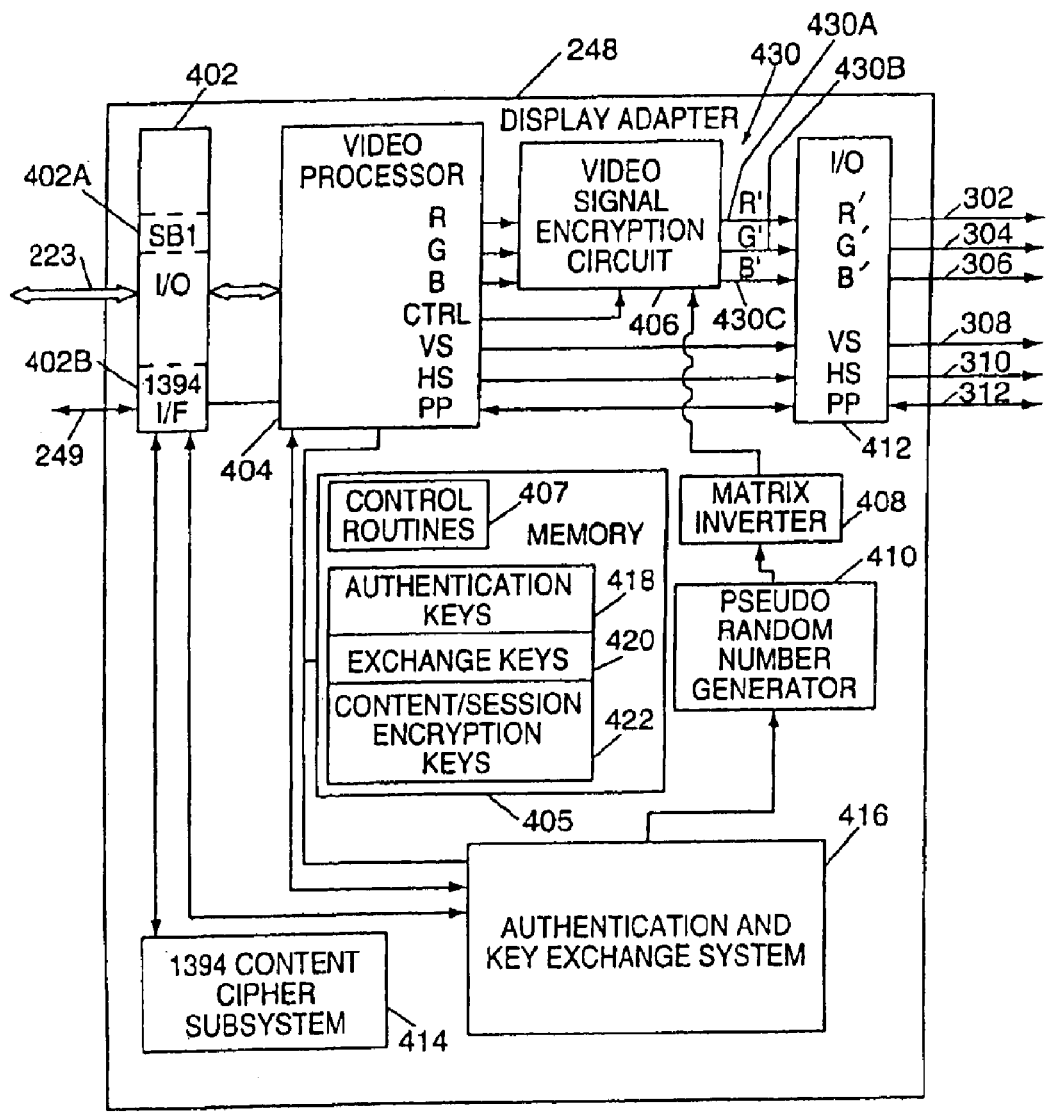
FIG. 5 illustrates our inventive display adapter of the present invention in greater detail.

FIG. 5 illustrates cur inventive display adapter 248. Display adapter 248 may be implemented, e.g., as a separate plug-in card or incorporated directly into a motherboard of a computer system. As illustrated, the display adapter comprises input/output interface 402, video processor 404, video signal encryption circuit 406, I/O interface 412, memory 405, 1394 content cipher subsystem 414, authentication and key exchange system 416, pseudo-random number generator 410 and matrix inverter circuit 408 coupled together as shown. The display adapter may include optional system renewal subsystem 114 (shown in FIG. 1) coupled to authentication and key exchange subsystem 416.

I/O interface 402, shown in FIG. 5, includes system bus interface (SBI) 402A for interfacing between system bus 223 and display adapter components including video processor 404. In addition, I/O interface 402 includes IEEE 1394 interface 249 to facilitate interaction via the 1394 Firewire 249 between 5C Standard compliant devices and various components of the display adapter, e.g., 1394 content cipher subsystem 414 and authentication and key exchange system 416.

Figure 1:
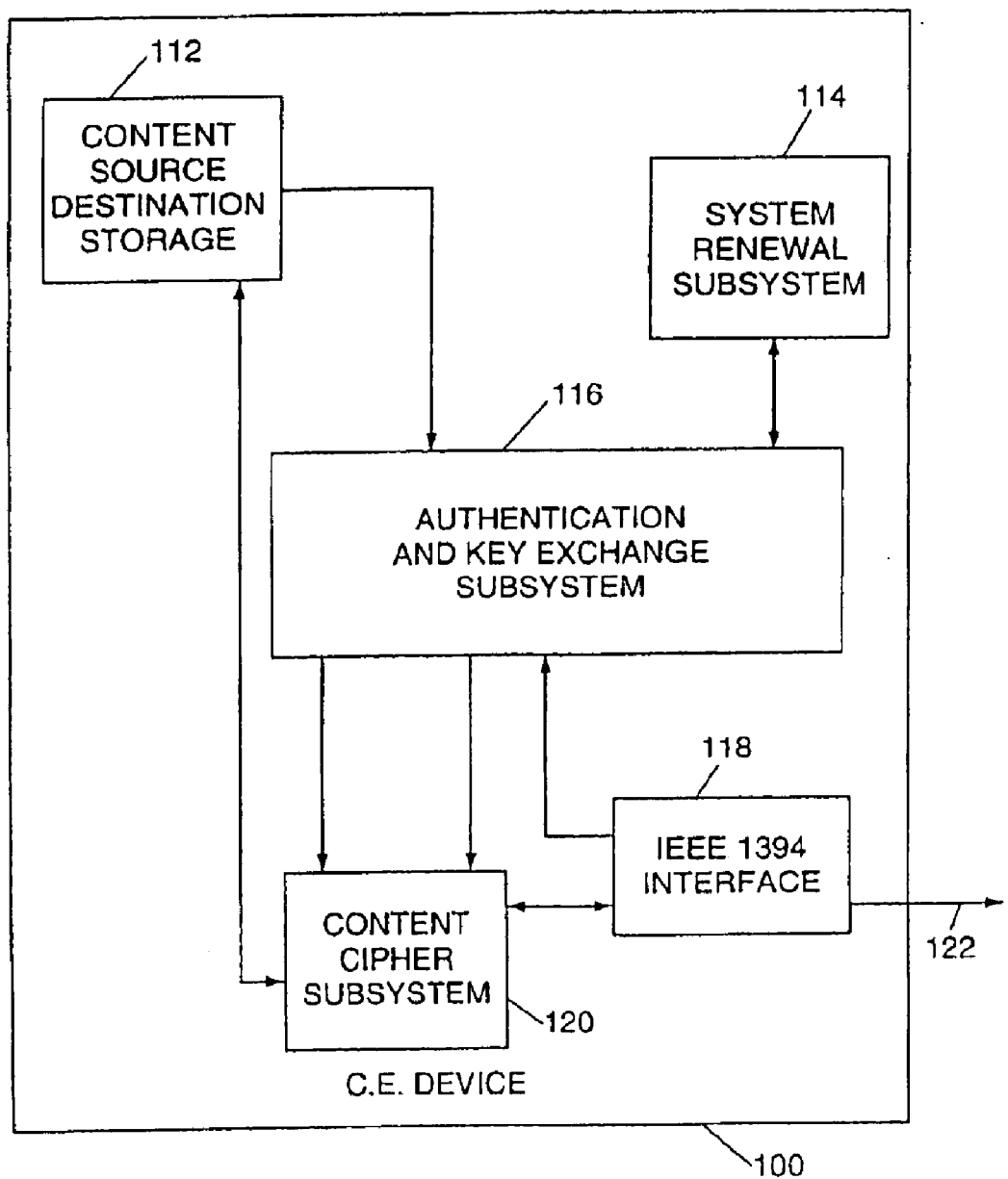
FIG. 1 depicts a block diagram of a conventional device capable of implementing the proposed 5C standard for secure communication of information in consumer electronic devices.

1394 content cipher subsystem 414 may be the same as, or similar to, that used in conventional known device 100 (as shown in FIG. 1). Content cipher subsystem 414, receives, from authentication and key exchange subsystem 416, the content (session) key to be used for encoding/decoding information being processed during a communication session and/or information relating to the encryption algorithm to be used. The content cipher subsystem decodes encoded data received via 1394 Firewire 249. Subsystem 414 also encodes data subject to copyright restrictions in accordance with the 5C Standard prior to transmission of that data via 1394 Firewire 249.

I/O interface 402 serves to couple 1394 content ciphers subsystem 414 to video processor 404 and system bus 223. Decoded video output produced by content cipher subsystem 414, copy restrictions permitting, can be transmitted over system bus 223 or processed by video processor 404. Video data processed by video processor 404 can be applied to a display via the video signal encryption circuit 406 and second I/O interface 412.

In accordance with our inventive teachings, encrypted data received via 1394 interface 402B can be stored and transmitted in encrypted form in a portion of PC 220 which is external to display adapter 248. However, to do so, the session key associated with the encrypted data would be maintained within secure display adapter 248 in, e.g., non-volatile memory 405. In this manner, the video data, being in encrypted form outside adapter 248, is thus protected, from unauthorized copying or editing. Since the display adapter stores the session key, stored encrypted video information can be played back at some future time through this adapter without compromising data security. This allows encrypted video information subject to copy restrictions to be stored safely, e.g., on hard disk 227 and later accessed, decrypted and rendered through the same display adapter. Doing so may be useful for some business and home applications where there is likely to be a delay between when copy restricted video information is received and ultimately viewed.

Note that for processing traditional non-secure video received over the 1394 Firewire, PC 200 (see FIG. 2) may edit this video information, save to disk, etc. in unencrypted form. However, when operating in secure mode, e.g., when processing information subject to copy restrictions, portions of PC 200, other than the display adapter, act as a pipe for the encrypted data and a repository for secure content.

Video processor 404, shown in FIG. 5, processes the received video signals, for performing various processing operations thereon, and controls operation of video signal encryption circuit 406. Possible signal processing operations include, e.g., decoding MPEG video data, editing data, and converting digital video data and/or images into analog red, green and blue video signals. Video processor 404 may be implemented as a digital signal processing circuit with digital-to-analog (D/A) converters for generating the analog output signals. In addition to generating the red (R), green (G), and blue (B) analog video signals, video processor 404 generates vertical synchronization signals, horizontal synchronization signals, and display information request signals, and also responds to information provided, via plug and play line 312, by the display device.

Video processor 404 is coupled to memory 405 wherein various control routines 407 are scored. The memory may also include image processing routines. The control routines control video processor operation and display interaction, e.g., in accordance with the steps 350 shown in FIG. 4.

In addition to storing control routines 407, memory 405 may store authentication keys (certificates) 418, exchange keys 420 and content/session keys 422. The authentication keys are used for proving the identity of display adapter 248 to other devices. Exchange keys are used for encrypting messages sent to devices coupled to display adapter 248. Content/session encryption keys are used for encrypting signals transmitted by the display adapter to a device coupled thereto, e.g., a 5C Standard compliant device or display device 247 that implements our inventive analog signal encryption technique.

Video processor 404 generates unencrypted R, G, and 5 video signals and also controls video signal encryption circuit 406 via CTRL signal.

When operating with a conventional monitor, i.e., a monitor that does not support encryption of analog video signals, the video processor limits its analog video signal output to video signals which are not subject to an analog signal encryption requirement. In such a case, video processor 404 controls video signal encryption circuit 406, via the CTRL signal, to output the R, G and B video signals without making alterations thereto. In such a case, the R, G and B video signals are output as analog video signals R', G' and B', respectively. These signals are then output via I/O interface 412 via corresponding signal lines 302, 304 and 306. I/O interface 412 may include a standard monitor connection for connecting the display adapter to conventional display devices as well as to inventive display device 247. In this manner, display adapter 248 can interact with conventional display devices.

When interacting with display device 247, video signal encryption circuit 406 is controlled by processor 404 so that the analog R, G and B video signals generated by the video processor are encrypted to generate video signals R', G' and B', respectively.

The encryption of the analog signals is performed as a function of a session key generated by authentication and key exchange system 416. The session key is used to drive pseudo-random number generator 410. The output of the pseudo-random number generator can be used directly by video signal encryption circuit 406, e.g., in the case of self inverting matrices or, alternatively, it may first he processed by matrix inverter circuit 408. The matrix inverter circuit processes the output of the pseudo-random number generator to ensure that the processing performed by video signal encryption circuit 406 will be the inverse of that performed by display device 247 when it receives the encrypted analog video signals.

In one relatively simple embodiment, the video signal encryption circuit 406 swaps, as a function of the pseudo-random number generator 410 output, the R, G, and B video signals to generate video signals R', G' and B'. Here, the signals on lines 430, specifically 430*a*, 430*b* and 430*c*, represent signals generated by switching the input to each line so that at any given time it is difficult to determine which of these three lines is being used to transmit the R, G, and B video signals. In such an embodiment, the R, G and B signals between the display adapter and monitor are pseudo-randomly swapped on a line-by-line basis. A session key, exchanged with the display device is used to drive pseudo-random number generator 410. Since the session key and pseudorandom number generation techniques are common to both the display adapter and display device, the display device can perform the inverse swapping operation to properly reconstruct the R, G and B video signals.

It is expected that a video pirate may attempt to decrypt analog video signals, encrypted using the above described line swapping technique, by examining the R', G' and B' video signals for inter-line correlations. To resist such an attempt, the signal on each of lines 302, 304, 306 can be composed from a keyed pseudo-random linear combination of the R, G and B incoming analog video signals supplied to video signal encryption circuit 406. As a result of such a combination, simple inter-line correlations will not reveal coefficients used during encryption which otherwise could allow the pirate to recover the original signal. Significantly, while being difficult to break, our inventive encryption scheme can be implemented using relatively inexpensive circuitry that is rather simple to manufacture.

in particular, the encryption performed on the received R, G and B video signals to generate "transformed" first (R'), second (G'), and third (B') video signals can be expressed as follows:

$$R'=a_1R+b_1G+c_1B$$

$$G'=a_2R+b_2G+c_2B$$

$$B'=a_3R+b_3G+c_3B$$

where:
R, G and B are original color video signals;
R', G', and B' are transformed "encrypted" first, second and third video signals; and
$a_n$, $b_n$ and $c_n$ are coefficients generated using a pseudo-random number generator, e.g., generator 410, driven by a session key.

Our inventive encryption and corresponding decryption transformations may be implemented as matrix multiplication operations where all or some of the matrix coefficients are generated by, or are a function of, the output of a pseudo-random number generator driven by a session key.

Such video signal encryption and decryption may be done using either digital or analog circuitry. For example, it may be accomplished on display adapter 248 using digital circuitry implemented as part of a digital signal processor which serves as video processing circuit 404. In the display device, e.g., monitor, where little or no DSP circuitry may be present, the decrypting may be done using analog circuitry.

Use of matrix inverter 408 ensures that the encoding/decoding operations will be the inverse of one another. It may, in some cases be easier to implement matrix inverter 408 using digital signal processor circuitry rather than through analog circuitry. Accordingly, it may be desirable to incorporate matrix inverter 408 into the inventive display adapter which is more likely, than the display device, to include a digital signal processor having extra processing capacity. However, if desired, matrix inverter 408 could be included in display device 247 as opposed to display adapter 248.

In accordance with our inventive teachings, a session key is used to drive pseudo-random number generator 410.

However, before a session key can be established, as discussed above with regard to FIG. 4, display adapter 248 first verifies that the receiving device is a trusted display, in contrast to a pirate video recorder, via the exchange of a certificate identifying the display device. This may be done by, e.g., transmitting information to the display device via one or more of video lines 302, 304, 306, vertical and horizontal sync lines 308, 320 and plug anal play line 312. Information from the display device may be received by video processor 404 via plug and play line 312. During normal operation, session key and synchronization information may be transmitted to the display in the horizontal or vertical blanking portion of the video signals.

Verifying the identity of the receiving, e.g., display, device and establishing a session key to be used for encrypting information transmitted between display adapter 248 and our inventive display 247 is similar to the verification and session key establishment problems addressed by the 5C standard.

Advantageously, the same type of digital certificate and content key used by 5C Standard devices is used by our present invention. However, the communication between the display adapter and display is over one or more of lines 302, 304, 306, 308, 310, 312 and not 1394 Firewire. Thus, the analog encryption scheme of the present invention is well suited for use in 5C Standard devices where the establishment and exchange of session keys as part of an analog encryption session may be implemented using much of the authentication and key exchange functionality provided for 5C Standard compliance, e.g., authentication and key exchange system 416. Accordingly, our inventive analog encryption scheme is well suited for use in conjunction with, or as an enhancement to, the 5C Standard. Authentication and key exchange system 416 is coupled to video processor 404 to facilitate use of system 416 in establishing and maintaining analog video encryption sessions.

As discussed above, a session key is used to drive pseudo-random number generator 410 which generates coefficient values used during encryption/decryption. A rate at which the session key is changed affects the level of security provided. To increase the complexity of cryptoanalysis required to break the encryption, as compared to embodiments which do not modify the session key during an established communication session, a new session key can be used for each scan line of an image being transmitted to the display. For enhancement security, the session key can be modified multiple times during a single scan line thereby varying the coefficients used to encode the video signals corresponding to a scan line.

As discussed above, to eliminate a need for an inversion circuit and/or matrix inversion operation, self-inverting matrices may be used. FIG. 7 illustrates a matrix multiplication operation that may be performed by the video signal encryption circuit 406 to encrypt R, G and B video signals. Reference numeral 602 indicates a self-inverse matrix that can be used to encrypt R, G, and B signals.

From a security standpoint, the values of the matrix used for encryption/decryption should be such that the matrix remains non-singular.

For decoding to accurately occur, display adapter 248 and display device 247 need to be synchronized such that the correct session key is used for decoding each line of both transmitted and received video images. Synchronization Should occur promptly after loss of synchronization, e.g., due to loss of power or a noise signal. One approach to maintaining synchronization is to periodically establish a new session key, e.g., every few seconds, e.g., 5 seconds.

In the event display device 247 loses power, this display device 247 can signal the display adapter 248 via one of plug and play lines 312 to establish a new session key.

Alternatively, the display device 247 can actively monitor and detect loss of adapter/display synchronization. Specifically, the display adapter 248 transmits a frame counter value to the display device 247 during each vertical blanking period. The display device maintains its own count of received frames which it then compares to a value provided by display adapter 248. If a is match between the frame count provided by the display adapter 248 and that maintained in the display device is detected by the latter, the display device 247 signals the display adapter 248 to initiate a resynchronization operation.

Having described our inventive video encryption method and the interaction of video adapter 248 and display device 247, we will now describe display device 247 in detail.

Figure 6:
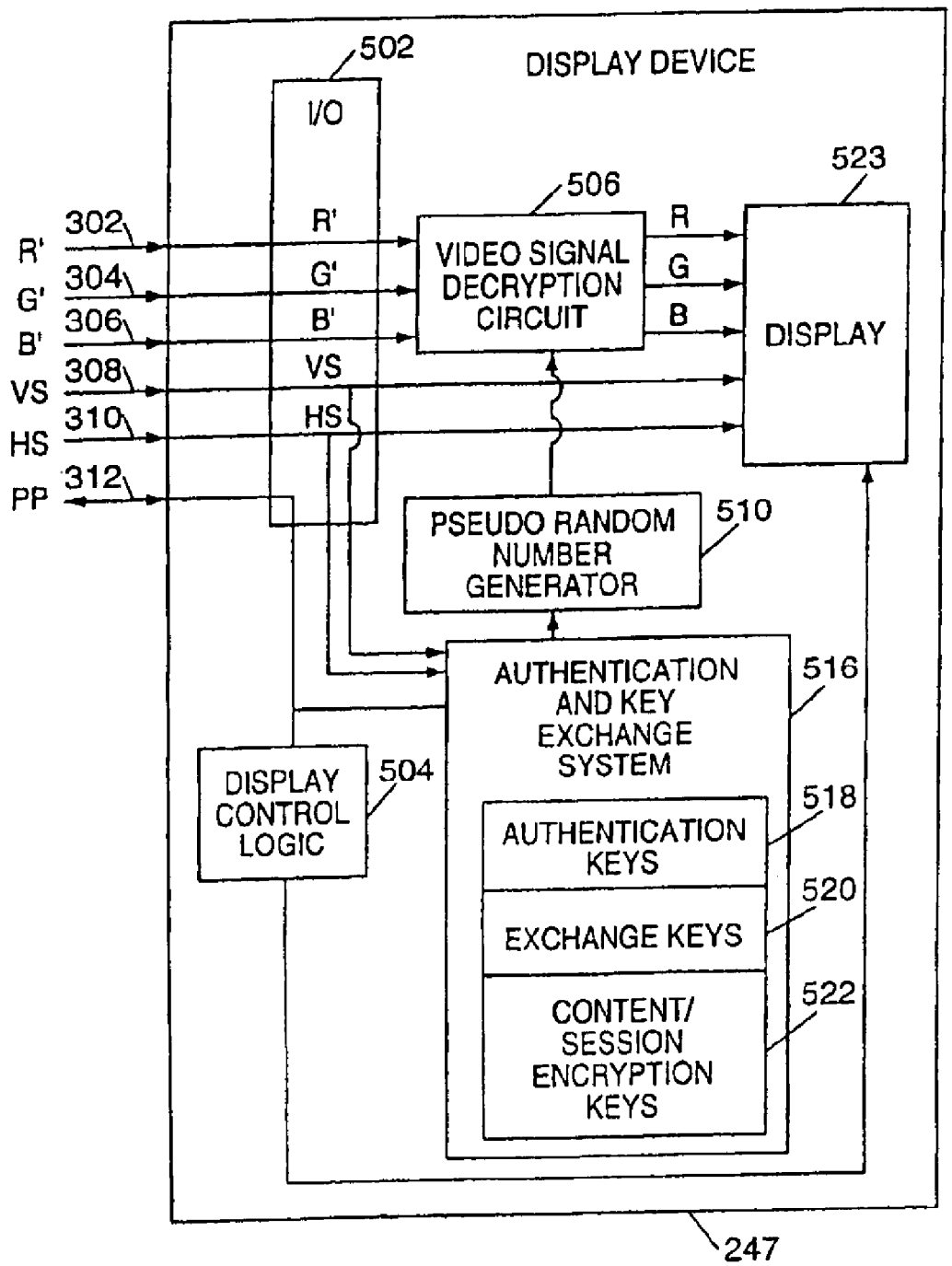
FIG. 6 illustrates display device 247, as shown in FIG. 2, in greater detail.

FIG. 6 illustrates an exemplary embodiment of display device 247. This device includes I/O interface 502, display control logic 504, video signal decryption circuit 506, display 523, pseudo-random number generator 510 and authentication and key exchange system 516 coupled together is shown. Display device 247 may also include (though not shown) an optional system renewal subsystem coupled to authentication and key exchange system 516.

I/O interface 502 connects various components of the display device to signal lines 302, 304, 306, 308, 310 and 312 which collectively couple display device 247 to display adapter 248. I/O interface 502 may include a standard monitor cable connector, e.g., a DB-9 connector, for line connection purposes.

Display control logic 504 controls various display operations, e.g., screen width, etc. under control of, e.g., a stored routine, located in memory (not specifically shown) situated within display control logic 504.

Control logic 504 detects synchronization loss and, in response, initiates re-synchronization. In order to detect display adapter/display device synchronization loss, display control logic 504 maintains a frame count, as discussed above, and compares that count to frame count information provided by display adapter 248. If a mis-match is detected between these frame counts, control logic 504 initiates a re-synchronization operation which involves establishment of a new session key.

Authentication and key exchange system 516 interacts with display adapter 248 and stores keys 522, 520, 518 used for decoding received data, communicating with other device and proving authenticity of display device 247. Certificates containing, e.g., authentication keys 518, are stored in memory (also not shown) which forms part of system 516. Keys 518, 520, 522 may be stored in non-volatile tamper-resistant memory, e.g., an epoxy coated memory device, to prevent unauthorized access to these keys.

The session key established by the authentication and key exchange system 516 serves as input to pseudo-random number generator 510. The output of the pseudo-random number generator 510 is used by the video signal decryption circuit 506 in. performing a decryption operation. The pseudo-random number generator output represents matrix coefficients Which are used as part of a matrix multiplication operation performed by video signal decryption circuit 506. Hence, a session key drives the pseudo-random number generators, used for encrypting and decrypting, in display adapter 248 and 247, respectively.

Video signal decryption circuit 506 performs, as a function of the pseudo-random number generator output, inverse processing to that performed by encryption circuit 406 of display adapter 248. In this manner, the signals R', B', G' received via lines 302, 304, 306 are converted back into the unencrypted R, G, and B video signals. The unencrypted R, G and B signals are supplied, along with the vertical and horizontal synchronization signals, to display 523 which may be, e.g., a cathode ray tube (CRT) or liquid crystal display (LCD).

While the swapping of analog signals on lines 302, 304 and 306 provides a high degree of security, individual R, G and B signals can be encrypted by simply using the output of the pseudo random number generator 410 to provide coefficients which are used to modify analog signal values, e.g., amplitude values. By varying these coefficients over time and using different coefficients for encrypting each of the R, G and B signals, adequate protection against unauthorized copying and use may be achieved.

As discussed above, in accordance with various embodiments of the invention, analog R, G, B video signals of processed, e.g., subjected to a matrix multiplication operation, to form encrypted R', G', and B' video signals. In such an embodiment, the R, G, and B signal combinations used to form the R', G' and B' video signals may be varied as a function of the output of a pseudo random number generator which supplies matrix coefficient values.

In one particular exemplary embodiment the values in the matrix which are multiplied with the R, G, B signals are controlled so that two of the three R, G, and B signals are added and one subtracted to form each of the analog encrypted R', G', B' video signals. In such an embodiment, since each one of the transmitted encrypted analog video signals is produced from the three signal components, it is considerably more difficult to decrypt than the case where R, G, B signals are subject to permutation matrix as opposed to combining the signals to produce the encrypted R', G', B' signals.

Figure 8:
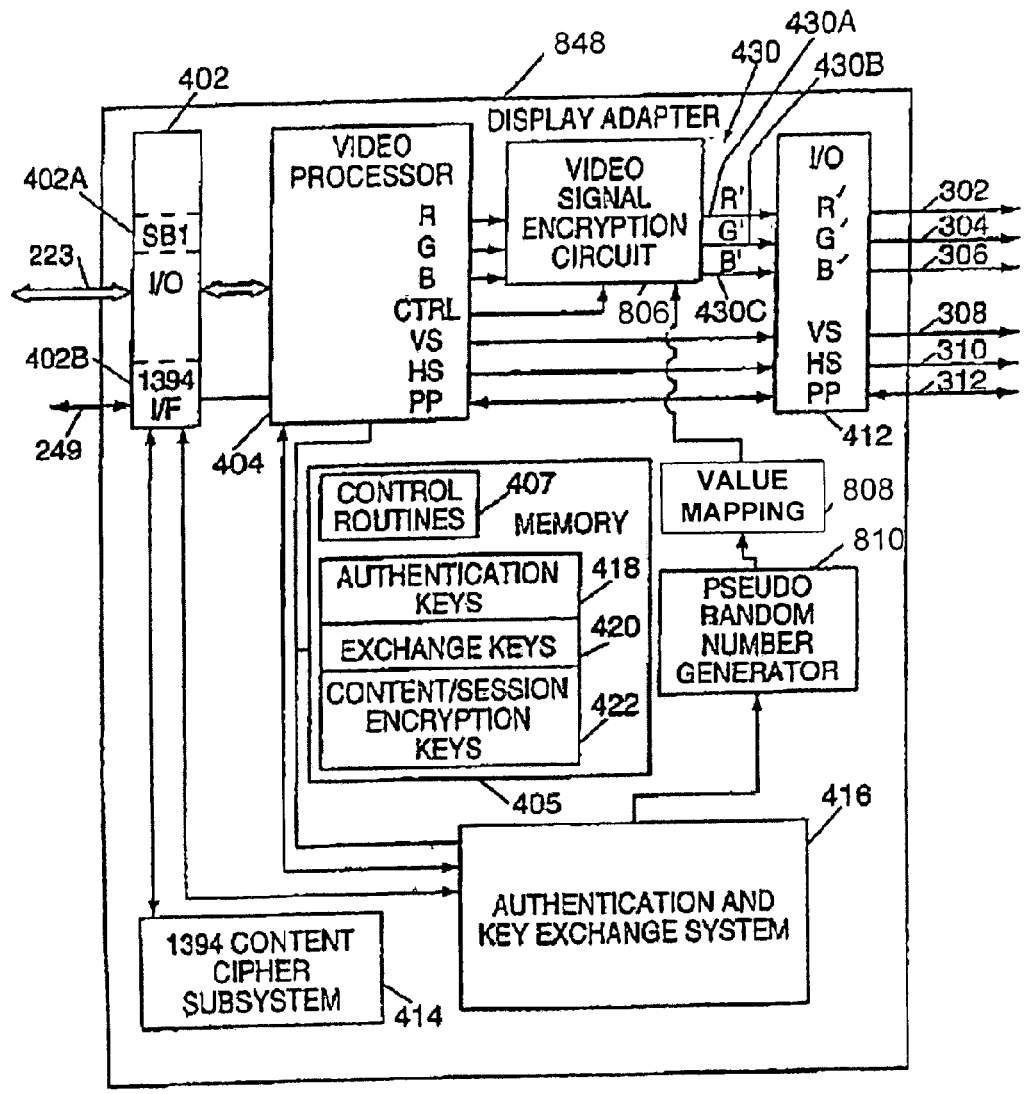
FIG. 8 illustrates a display adapter implemented in accordance with another exemplary embodiment of the present invention.

A display adapter 848 capable of generating encrypted analog R', G' and B' signals from unencrypted analog, R, G, B signals, with each encrypted signal being a function of one or more of the unencrypted analog signals, is shown in FIG. 8. The display adapter 848 includes many components which are the same as, or similar to those previously discussed with regard to FIG. 5. Such components are identified in FIG. 8 using the same reference numerals as used in FIG. 5 and will not be described again in detail. Note that the display adapter 848 includes a pseudo random number generator 810 and video signal encryption circuit 806 which perform similar functions to those of the like named FIG. 5 components. Due to implementation issues relating to the encryption circuit 806, and restrictions on the values which can be generated by the pseudo random number generator 810, these circuits may be implemented using hardware and/or software that differs from that used to implement the like named circuits found in the FIG. 5 embodiment.

In addition to the above discussed components, the display adapter 848 includes a value mapping circuit 808 which is not present in the FIG. 5 embodiment. The operation of the value mapping circuit 808 will be discussed in detail below.

In accordance with one feature of the invention, the pseudo random number generator 810 operates in response to input from the authentication and key exchange system 416 to periodically generate a set A' of values representing a 3×3 RLC (restricted linear combination) permutation matrix of 0's and 1's. Since the matrix is a 3×3 matrix, 9 values are output by the generator 810 for each encryption period, e.g., the time during which a line of a video display is transmitted. A tenth value α, which will be discussed below, may also be output for each encryption period.

As a result of restrictions on the possible values in the 3×3 matrix, a single 1 and two 0's will be included in each row and column of the 3×3 matrix A'. That is, we start from any 3×3 ordinary permutation matrix A' which can be used to swap the lines used to transmit R, G, and B signals.

An exemplary matrix of this type is shown below:

$$A' = \begin{bmatrix} 0 & 1 & 0 \\ 0 & 0 & 1 \\ 1 & 0 & 0 \end{bmatrix}$$

The set A' of values generated by the pseudo random number generator 810 are supplied to the value mapping circuit 808. The value mapping circuit 808 maps each received 1 to −α, and each 0 to +α, where α is an integer value, e.g., in the range of 1 to 10. Optionally, the pseudo random number generator 810 can supply α to the value mapping circuit 808 along with the permutation matrix coefficients.

In one particular embodiment α is set to 1 resulting in the mapping of 1's to −1 and 0's to +1. This results in a set A of mapped 3×3 matrix values including two +1's and one −1 in each row and column of the matrix.

Performing such a mapping operation on the exemplary matrix A' shown above, produces:

$$A = \begin{bmatrix} 1 & -1 & 1 \\ 1 & 1 & -1 \\ -1 & 1 & 1 \end{bmatrix}$$

This is an example of a Restricted Linear Combination. More generally, we can in addition multiply the matrix by a scalar, e.g., a value in the range of 1 to 10.

Note that as a result of the above discussed restriction on matrix coefficient values, each column and each row of values in the matrix includes two of the same values and one value that is different. Further note that the two matching values are positive and the other value is negative.

The set A of mapped permutation values is supplied to the video signal encryption circuit 806 of the present invention. As in the FIG. 5 embodiment, the video signal encryption circuit performs a matrix multiplication through the use of e.g., analog multipliers, to generate the inner product, vector V', of the supplied R, G, B analog video signals and the permutation matrix A. The matrix multiplication operation performed by encryption circuit 806 produces the vector V'. The vector V' comprises the encrypted analog video signals R', G', B'.

As a result of the above discussed restrictions placed on permutation matrix values, each of the encrypted signals R', G' and B' will be a function of three input signals R, G, B. This can make the encrypted signals harder to decrypt for unauthorized individuals than in the previously described embodiments.

Given a mapped permutation matrix A:
Let Ai denote row I of matrix A.

$$A = \begin{bmatrix} a_1 & b_1 & c_1 \\ a_2 & b_2 & c_2 \\ a_3 & b_3 & c_3 \end{bmatrix} = \begin{bmatrix} A1 \\ A2 \\ A3 \end{bmatrix}$$

The generation of the encrypted set of signals V' may be expressed as:

$$V' = V * A = \begin{bmatrix} R \\ G \\ B \end{bmatrix} \cdot \begin{bmatrix} A1 \\ A2 \\ A3 \end{bmatrix} = \begin{bmatrix} R' \\ G' \\ B' \end{bmatrix}$$

The steps 700; are performed by the video signal encryption circuit 806, to encrypt R, G, B video signals as a function of the mapped set A of permutation matrix values.

Analog video signal encryption begins in start step 702 wherein the mapped set A of permutation matrix values and the analog R, G, B video signals, representing the vector V, are received by the encryption circuit 806.

Then, in step 704, the inner product V' is generated by performing a matrix multiplication operation. V*A. The vector V' resulting from the matrix multiplication operation comprises analog output signals R', G' and B'. In step 706, the encrypted analog video signals R', G' and B' are output on their respective signal lines 430A, 430B, 430C.

The generation and outputting of the encrypted analog video signals R', G', B' performed in steps 704, 706 continues until a new set of mapped permutation values is supplied to the video encryption circuit 806. With a new set A of mapped permutation values being supplied to the encryption circuit 806, encryption using the previously supplied permutation values is halted in step 708.

As in the case of the FIG. 5 embodiment, the permutation matrix A', and thus mapped permutation matrix A, will be altered periodically in response to signals output by the authentication and key exchange system 416. Thus, the mapped permutation matrix used for encoding signals may vary periodically, e.g., from video line to video line or e.g., after the transmission of every n lines of video signals.

In the FIG. 8 embodiment, as a result of the mapped permutation matrix values used by encryption circuit 806, the encrypted analog video signals R', G' and B' will be a composite of the three analog input video signals, e.g., it may be a function of the sum of two signals minus the third signal. Because of the restrictions on the matrix used to generate the encrypted video signals R', G', B', each of the original R, G, and B analog signals can be generated at decryption time from a different pair (R',G'), (G',B'), (B',R') of the encrypted analog video signals. As the permutation matrix used for encryption purposes is varied, the encrypted signal pair from which the R, G, and B signals are generated will vary. This reflects the fact that, over time, as the permutation matrix is varied, the transmission lines used to transmit the encoded analog signals from which the R, G, and B signal components are reconstructed will vary.

Having described encryption of the analog R, G, B video signals as performed by the display adapter 848, decoding of the generated composite encrypted R', G' B' signals will now be described with reference to FIG. 9.

Figure 9:
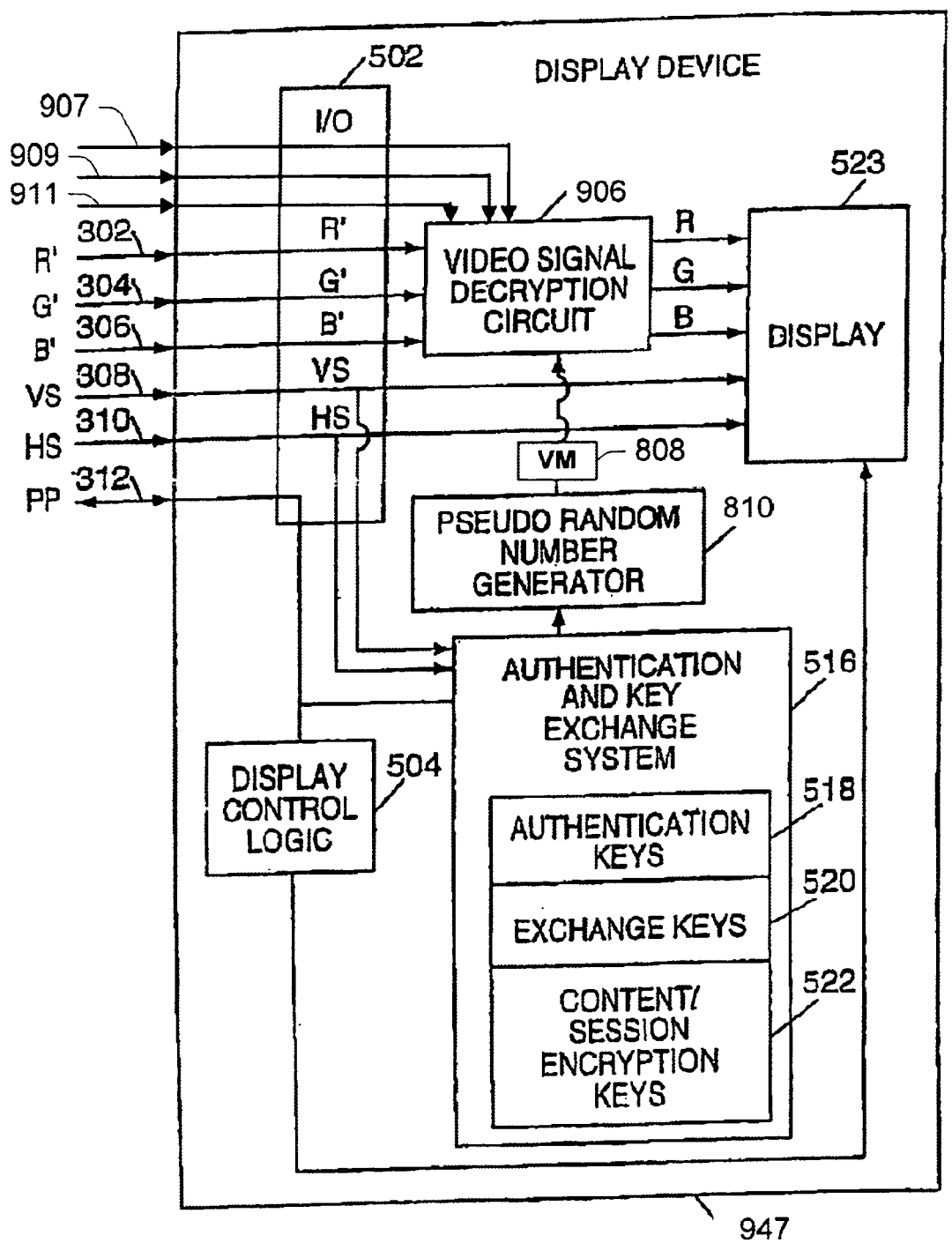
FIG. 9 illustrates a display device capable of decrypting and displaying video signals generated by the display adapter of FIG. 8.

FIG. 9 illustrates a display device 947 which is capable of receiving and decrypting the R', G' B' encrypted analog video signals generated by display adapter 848. The display device 947 includes many components which are the same as, or similar to, those previously discussed with regard to FIG. 6. Such components are identified in FIG. 9 using the same reference numerals as used in FIG. 6 and will not be described in detail. Note that the display device 947 includes a pseudo random number generator 810 and video signal decryption circuit 906 which perform similar functions to those of the like named FIG. 6 components.

Due to implementation issues relating to the decryption circuit 906, and the differences in the implemented analog signal encryption between the FIG. 6 and FIG. 9 embodiments, these circuits may be implemented using hardware and/or software that differ from that used to implement the like named circuits found in FIG. 6.

In addition to the above discussed components, the display device 947 includes a value mapping circuit 808 which is not present in the FIG. 6 embodiment. The pseudo random number generator 810 and value mapping circuit 808 may be implemented using identical circuitry in both the display adapter 848 and display device 947.

The authentication and key exchange system 516 controls the pseudo random number generator 810 to operate in a synchronized manner with the display adapter's pseudo random number generator 810. Thus, when decoding received encrypted analog video signals, R', G', B', the pseudo random number generator 810 is operated to generate the set of permutation matrix values A' that was used to encrypt the received R', G', B' signals.

The value mapping circuit 808 performs a mapping operation on the set A' of matrix values to generate the set A of mapped permutation matrix values. The set A of values is supplied to the video signal decryption circuit 906. In embodiments where the pseudo random number generator 810 generates α values the generated α value used to originally encode the R', G', B' signals is also supplied by the pseudo random manner generator 810 to the decryption circuit 906.

Video signal decryption circuit 906 decrypts the received analog encrypted video signals R', G' and B' and outputs to display 523 the decrypted analog video signals R, G, B.

Decoding can be performed according to the following formula.

Note that for purposes of implementation, the value 4 is used instead of 3 for defining various variables. Thus, during decryption, the mapped permutation matrix value A1=A1; A2=A3 and A3=A4. In addition the binary representation of base 10 values (1,2,4) are set to correspond with signal lines (R, G, B), respectively. Let K be a 3 bit vector and let k be the corresponding base ten integer. Vk is the analog signal value we assign to link k, where k ∈ (1, 2, 4) (e.g. V1 is the value for unencrypted R, V2 is the value for unencrypted G, V4 is the value for unencrypted B, and where V'1 is the encrypted signal R', V'2 is the encrypted signal G', V'4 is the encrypted signal B').

In such an implementation, the description algorithm is:
Let K denote a 3 bit vector, and let k be its integer value (the usual interpretation).

for (i,j)=(1,2), (2,4), (4,1) {
   K=~Ai&&~Aj; \* bit by bit AND of negated values *\
   Vk=(V'i+V'j)/2
}

In one particular embodiment of the signal decryption process 750 performed by video signal decryption circuit 906, the value 4 is not swapped for the value 3, e.g., A3 is not set to A4, and K=3 is used to designate the R signal line. In this particulcar embodiment, the process begins in start step 752 wherein the set A of mapped matrix values including vectors A1, A2, A3 is received by the decryption circuit 906. The value α may also be received in start step 752.

The decryption process is based on the fact that, as a result of the original permutation matrix restrictions and the implemented mapping process, each pair of signals (R',G'), (G',B') and (B',R') can be used to generate one of the uncoded R, G, and B signals. This can be done by simply summing the two signals in each pair of encoded signals and dividing by $2\alpha$, e.g., using analog summing and dividing circuitry. It is also based on the fact that rows in the mapped permutation matrix A, corresponding to the rows of the vectors in a vector pair (R',G'), (G',B') and (B',R'), can be compared to identify the uncoded analog signal which can be generated from the vector pair. Each encoded signal pair may correspond to one of three possible signals (R, G, B). For the sake of convenience we can define a control value k, where a value of K=1 corresponds to the signal R, a value of k=2 corresponds to the signal G, and a value of k=3 corresponds to the signal B.

As will be discussed below, the control value k may be used to control which of the three possible signal lines 907, 909, 911, is used to output an uncoded video signal generated by the video decryption circuit 906.

The control value k, for a particular encrypted signal pair, can be easily determined by comparing the values in the corresponding rows of the mapped permutation matrix A, to identify the column k, where the corresponding rows have a value which agrees.

For example, the value k, for the first signal pair (R',G') can be found by comparing mapped permutation matrix vectors A1 and A2 to find the column, k, in which they agree.

The value k for the second signal pair (G',B') can be found by comparing mapped permutation matrix vectors A2 and A3 to find the column, k, in which they agree.

The value k for the third signal pair (B',R') can be found by comparing mapped permutation matrix vectors A3 and A1 to find the column, k, in which they agree.

Thus, for each pair of encrypted signals (R',G'), (G',B'), (B',R'), a corresponding decrypted analog video signal (V) and corresponding control value (k) is calculated as follows:

$$V_{(R', G')} = (R'+G')/2\alpha$$

$$V_{(G', B')} = (G'+B')/2\alpha$$

$$V_{(B', R')} = (B'+R')/2\alpha$$

$k_{(R', G')}$ = column location where A1 and A2 have matching values
$k_{(G', B')}$ = column location where A2 and A3 have matching values
$k_{(B', R')}$ = column location where A3 and A1 have matching values The decryption process 750 performed by the video decryption circuit 906 begins in start step 752 wherein the encrypted analog video signals R', G' and B' are received as well as the set A of values of the mapped permutation matrix used to encrypt the signals which are to be decrypted. $\alpha$ is also received in step 752 in embodiments where $\alpha$ is not fixed, e.g., set to 1. Operation proceeds from start step 752 to step 754 wherein one of a first through third decrypted video signal $V_{(R',G')}$, $V_{(G',B')}$, $V_{(B',R')}$, is generated for each pair (R',G'), (G',B'), (B',R') of encrypted video signals.

Then, in step 756, a control value k is generated for each of the first through third decrypted video signals. Then in step 758, each of the first through third decrypted video signals is output to the signal line indicated by the corresponding control value k generated in step 756. In step 758, the decrypted video signal for which a control value of 1 was generated in step 756 is output on the R signal line 907; the decrypted video signal for which a control value of 2 was generated in step 756 is output on the G signal line 909; and the decrypted video signal for which a control value of 3 was generated in step 756 is output on the B signal line 911.

The generation of the decrypted analog video signals, using a given set of mapped permutation values, stops in step 760, e.g., when a new set of mapped permutation values is to be used for decryption purposes.

Since the values of k remain the same for a fixed set of mapped permutation values, the control values k need only be calculated once for each set of mapped permutation matrix values. Since analog signals are being decrypted, the analog summing and division process of step 754 is performed on a continuous basis for the duration that a set of encrypted analog signals is to be decrypted, using a supplied mapped permutation matrix A.

It will be apparent that various operations which form part of the decryption process 750, e.g., the generation of the control values k, can be performed in parallel with the generation of the decrypted analog video signals V. It will be apparent that the generation of each of the values k and the first through third decrypted video signals V may be performed in parallel as well if desired. Alternatively, the circuits used to generate the decrypted analog video signals or the control value k, may be used on a time shared basis. In such embodiments, the generation of each of the first through third decrypted video signals and/or control values k, will occur serially.

Various decryption examples will now be discussed in detail.

Consider for example the following case where $\alpha$=1:

$$A = \begin{bmatrix} a1 & b1 & c1 \\ a2 & b2 & c2 \\ a3 & b3 & c3 \end{bmatrix} = \begin{bmatrix} 1 & -1 & 1 \\ 1 & 1 & -1 \\ -1 & 1 & 1 \end{bmatrix} = \begin{bmatrix} A1 \\ A2 \\ A3 \end{bmatrix} ; V' = \begin{bmatrix} R' \\ G' \\ B' \end{bmatrix}$$

In such a case, decryption values will be as follows:

$V_{(R',G')} = [R'+G']/2$; $k_{(R',G')}=1$; Thus $V_{(R',G')}=R$ $V_{(G',B')} = [G'+B']/2$; $k_{(G',B')}=2$; Thus $V_{(G',B')}=G$ $V_{(B',R')} = [B'+G']/2$; $k_{(G',R')}=3$; Thus $V_{(B',R')}=B$ Obviously, as discussed above, a different mapped permutation matrix A could result in a different assignment of the first through third decrypted analog signals.

Consider for example the additional exemplary case where $\alpha$=1:

$$A = \begin{bmatrix} a1 & b1 & c1 \\ a2 & b2 & c2 \\ a3 & b3 & c3 \end{bmatrix} = \begin{bmatrix} 1 & 1 & -1 \\ -1 & 1 & 1 \\ 1 & -1 & 1 \end{bmatrix} = \begin{bmatrix} A1 \\ A2 \\ A3 \end{bmatrix} ; V' = \begin{bmatrix} R' \\ G' \\ B' \end{bmatrix}$$

Figure 10:
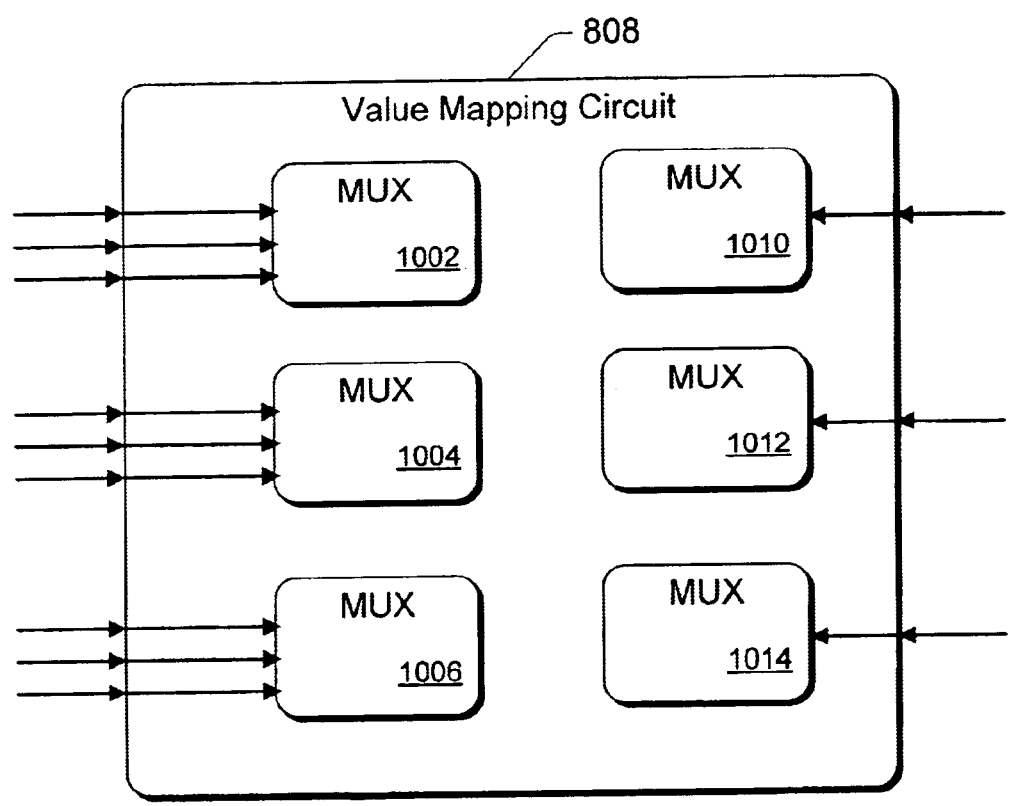
FIG. 10 illustrates a value mapping circuit of the present invention.

In such a case, decryption values will be as follows:

$V_{(R',G')} = [R'+G']/2$; $k_{(R',G')}=2$; Thus $V_{(R',G')}=G$ $V_{(G',B')} = [G'+B']/2$; $k_{(G',B')}=3$; Thus $V_{(G',B')}=B$ $V_{(B',R')} = [B'+G']/2$; $k_{(B',R')}=1$; Thus $V_{(B',R')}=R$ An exemplary value mapping circuit 808, which may be used in the display adapter 848 and display device 947, is illustrated in FIG. 10. The illustrated embodiment assumes that the 9 values in the set A' of permutation matrix values are supplied to the value mapping circuit 808 in parallel, e.g., each on a different line.

The value mapping circuit 808 comprises first through third sets of multiplexers 1002, 1004, 1006 coupled together as shown in FIG. 10. The first set of multiplexers 1002 is responsible for processing the three values comprising A1, corresponding to the first row of the matrix A. Similarly, the second and third sets of multiplexers 1004, 1006 are responsible for processing the values A2, A3 in the second and third rows of the matrix A, respectively.

Each set of multiplexers 1002, 1004, 1006 includes first through third mutliplexer 1010, 1012, 1014. Each of the first through third multiplexers 1010, 1012, 1014 is supplied at a control input, with a different one of the coefficient values from the vector A1, A2, or A3, which is to be mapped. First and second data inputs to the MUXes 1010, 1012, 1014 are supplied the value +α, −α, respectively.

In this example, α corresponds to 1. As discussed above the value α may be generated by the pseudo random number generator 810. Since an α of 1 is being used, the first data input of each MUX 1010, 1012, 1014 is supplied with +1, while the second input is supplied with the value −1.

The permutation matrix coefficient supplied to the control input of each MUX 1010, 1012, 1014 is used to determine whether the signal supplied to the first or second data inputs of each MUX will be output. In the FIG. 10 embodiment, a value of 0 supplied to a MUX control input will result in the signal +α, e.g., 1 being output. However, a value of 1 supplied to a MUX control input will result in the signal −α, e.g., −1 being output. Thus, MUXes 1010, 1012, 1014 provide a relatively simple way to map the set A' of 0 and 1 values to the +α and −α values of the mapped permutation matrix A.

Figure 11:
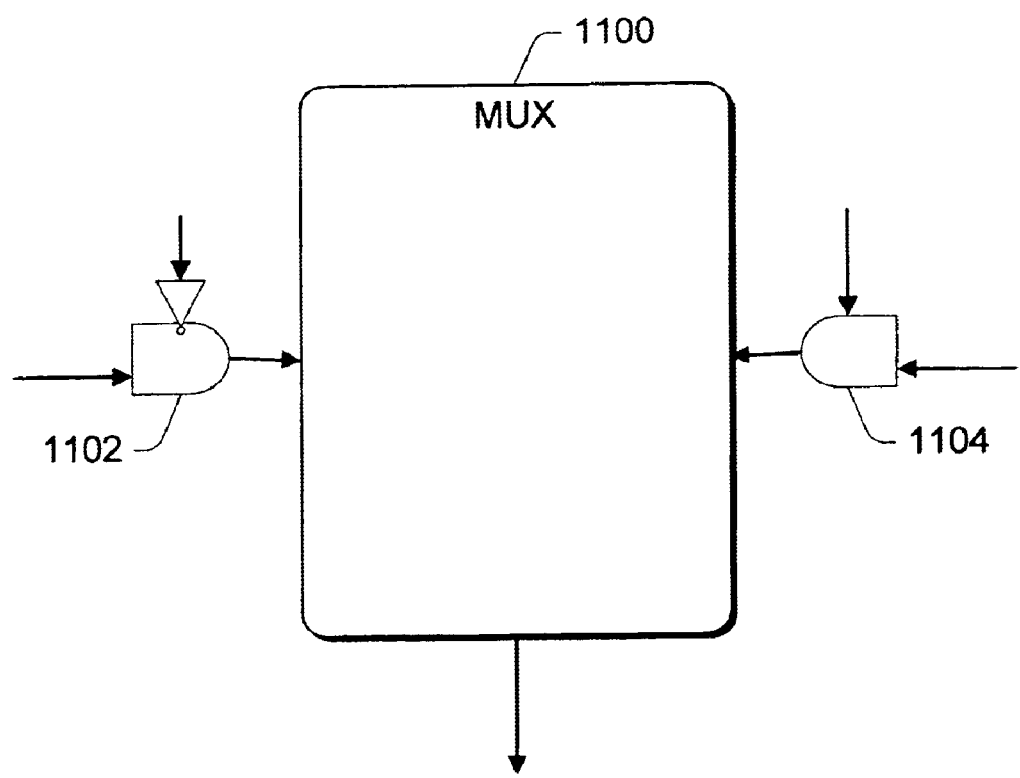
FIG. 11 illustrates a MUX suitable for use in the value mapping circuit illustrated in FIG. 10.

FIG. 11 illustrates a MUX 1100 suitable for use as any one of the MUXes 1010, 1012, 1014. The MUX 1100 comprises first and second analog pass gates 1102, 1104. The first analog pass gate 1102 has a negated control input while the second analog pass gate 1104 has a standard control input. The value +α, e.g., +1, is supplied to the signal input of the first pass gate 1102 while the value −α, e.g., −1, is supplied to the signal input of the second pass gate 1102. The outputs of the first and second pass gates are both coupled to the output of the MUX 1100.

As a result of the negated input on the first pass gate 1102, the input signal (+1) to the first pass gate 1102 will be output by the MUX 1100 when the control signal input is a 0. Since the control input of the second pass gate 1104 is not negated, the input signal (−1) to the second pass gate 1104 will be output by the MUX 1100 when the control signal is 1.

The values generated by the MUXes 1010, 1012, 1014 in the first through third sets of MUXEs 1002, 1004, 1006 are output as the values in the first through third rows of values A1, A2, A3, in the set A of mapped permutation matrix values.

The following describes an encryption circuit 806 suitable for use as the encryption circuit of FIG. 8. This suitable encryption circuit includes first through third signal encryption modules which are responsible for generating the R', G' and B' encrypted analog signals, respectively. Each of the first through third encryption modules includes first, second and third analog multipliers and an analog adder. The gain of the first through third analog multipliers in each of the encryption modules is controlled by a corresponding mapped permutation matrix value. The values used to control the first through third adders of the first encryption module are the values $[A1_1, A1_2, A1_3]$ which form the first row A1 of the mapped permutation matrix A. The values used to control the first through third adders of the second encryption module are the values $[A2_1, A2_2, A2_3]$ which form the second row A2 of the mapped permutation matrix A. The values used to control the first through third adders of the third encryption module are the values $[A3_1, A3_2, A3_3]$ which form the third row A3 of the mapped permutation matrix A.

The signals output by a decryption module's first through third analog multipliers are summed by the analog adder. In this manner, the encrypted analog video signal R' is generated by the first encryption module, the encrypted analog video signal G' is generated by the second encryption module 1111, and the encrypted analog video signal B' is generated by the third encrypted module.

The following describes a video signal decryption circuit 906 suitable for use in the display device 947. As illustrated, the video signal decryption circuit includes first, second and third decryption modules each of which is responsible for enerating one of the decoded analog R, G, B video signals. Which particular decryption module will generate the R, G, or B signal at any given time will depend on the mapped permutation matrix A.

Each of the first through third decryption modules processes a different pair of encrypted R', G', B' analog video signal to generate a decrypted analog video signal therefrom. The first decryption module processes the pair of encrypted signals (R', G'), the second decryption module processes the pair of encrypted signals (G',B'), while the third decryption module processes the pair of encrypted signals (B', R').

The decryption modules each include an analog adder and divider circuit, first through third pass gates and an output control circuit. The analog adder and divider circuit receives as its input the two encrypted video signals to be processed. If a variable α is supported, then the circuit also receives an α value to be used. In case where α is fixed, e.g., at 1, the α input is not required. The circuit generates a decrypted analog video signal by summing the two encrypted input signals and dividing by 2 α. The decoded video signal is supplied to the input of each of the three pass gates.

The first pass gate of each decryption module is coupled to the R signal output line, the second pass gate of each decryption module is coupled to the G signal output line, while the third pass gate of each decryption module is coupled to the B signal output line. Each pass gate passes an input signal when a 1 is supplied to the control input of the pass gate, and blocks the input signal when a 0 is supplied to the control input of the pass gate. Thus, by controlling the pass gates the decrypted video signal generated by any one of the first, second or third decryption modules can be output on any one of the R, G, or B signal lines.

The control circuit of each decryption module determines to which R, G, or B output line the decrypted video signal produced by the module will be sent. The first, second and third decryption modules are controlled so that they each output the decrypted video signal they produce to the correct one of the R, G, B video signal lines.

The output line for a video signal, generated from a particular encrypted signal pair, is determined by comparing the corresponding rows of values in the mapped permutation matrix and finding the column location where the values agree. The control circuit does this by performing a bit wise ANDing operation after negating mapped permutation values included in the two rows from the set A1, A2, A3, which correspond to the set of encoded signals being processed. Accordingly, the control circuit of the first decoder module performs a bit wise ANDing operation after negating permutation matrix values A1, A2. The control circuit of the second decoder module performs a bit wise ANDing operation on negated permutation matrix values A2, A3. Similarly, the control circuit of the third decoder module performs a bit wise ANDing operation on negated permutation matrix values A3, A1.

The ANDing operation performed by the control circuits produces a threebit control signal with a 1 located at the bit location where values in the two rows of the mapped permutation matrix being compared agree. The two other bits of the resulting 3 bit signal will be zero. The first through third bits generated by the control circuit are used to control, the first through third pass gates of the corresponding demodulator module. In this manner, the decrypted video signal generated by the decryption modules is routed to the proper one of the R, G, B signal lines.

Various exemplary embodiments have been described above. In view of the description provided above, various modifications will be apparent to those skilled in the art without deviating from the inventive teachings described and claimed herein.

What is claimed is:

1. A method of generating encrypted analog first, second and third signals (R', G', B', respectively) from first, second, and third analog input signals (R, G, B, respectively) the method comprising:

pseudo-randomly generating at least one of a plurality of matrix coefficients a1, a2, a3, b1, b2, b3, c1, c2, c3;

using an encryption circuit to perform a matrix multiplication operation to generate the encrypted analog first, second, and third signals, according to the following equations:

$$R'=a1R+B1G+c1B$$
$$G'=a2R+b2G+c2B$$
$$B'=a3R+b3G+c3B$$

wherein the matrix coefficients are generated such that each of the R', G' and B' signals will be the product of summing two signals in the set of analog signals R, G, B and subtracting one of the signals in the set of analog signals R, G, B.

2. A communication method comprising the steps of:

using a pseudo-random number generator to generate output values; and modifying first, second and third signals, by performing a matrix multiplication operation thereon utilizing matrix coefficients which are a function of at least one of the pseudo-random output values, the modified first, second and third signals being encrypted analog signals so as to define first, second and third encrypted analog signals; and transmitting the first, second and third encrypted analog signals to a destination device;

wherein said matrix multiplications involves summing an integer multiple of two of the first, second and third signals and subtracting an integer multiple of another one of said first second and third signals to produce the first encrypted analog signal.

3. A method of decrypting encrypted analog signals including the steps of:

generating a first decrypted analog signal from a first pair of encrypted analog signals by:

summing the two encrypted analog signals in the first pair of analog signals to produce a first sum;

dividing the first sum by a first value to produce a first decrypted analog signal, and further comprising:

comparing values in first and second rows of values to identify a first column of values in which the first and second rows of values include the same value; and controlling which one of a plurality of output lines the first decrypted analog signal is transmitted on as a function of the identified column values.

4. The method of claim 3, further comprising:

generating a second decrypted analog signal from a second pair of encrypted analog signals by:

summing the two encrypted analog signals in the second pair of analog signals to produce a second sum; and dividing the second sum by a second value to produce a second decrypted analog signal.

5. The method of claim 4, further comprising:

generating a third decrypted analog signal from a third pair of encrypted analog signals by:

summing the two encrypted analog signals in the third pair of analog signals to produce a third sum; and dividing the third sum by a third value to produce a third decrypted analog signal.

6. The method of claim 5, wherein the first second and third values are the same.

7. The method of claim 6, wherein the first second and third values are integer multiples of 2.

8. The method of claim 6, further comprising the step of:

periodically changing the value used for the first, second and third values as a function of the output of a pseudo random number generator.

9. The method of claim 5, further comprising:

comparing values in first and second rows of values to identify a first column in which the first and second rows of values include the same value;

comparing values in second and third rows of values to identify a second column in which the second and third rows of values includes the same value, the second column being different than said first column; and controlling which one of a plurality of output lines the first decrypted analog signal is transmitted on as a function of the identified first column and which one of the plurality of output lines the second decrypted analog signal is transmitted on as a function of the identified second column, the first and Second decrypted analog signals being transmitted on different output lines.

10. The method of claim 9, wherein the first and second rows of values are first and second rows of values included in a permutation matrix used to encrypt the analog signals included in the first pair of signals.

11. The method of claim 9, further comprising:

comparing, values in a third row of values and said first row of values to identify a third column in which the third and first rows of values include the same value; and controlling which one of a plurality of output lines the third decrypted analog signal is transmitted on as a function of the identified third column, the third decrypted analog signal being transmitted on a different output line from said first and second decrypted analog signals.

12. The method of claim 10, wherein the first and second rows of values are first and second rows of values included in a permutation matrix used to encrypt the analog signals included in the first pair of signals;

wherein the second and third rows of values are Second and third rows of values included in said permutation matrix; and wherein the third and first rows of values are third and first rows of Values included in said permutation matrix.

13. The method of claim 9,
wherein the first, second and third decrypted analog signals are red, green and blue analog video signals; and
wherein the plurality of output lines include red, green and blue output lines which ere coupled to a display device.

14. A method of generating an encrypted analog signal from at least two of a first analog input signal, a second analog input signal, and a third analog input signal, the method comprising:
pseudo-randomly generating an encryption value;
multiplying a first one of said first, second, and third analog input signals with said encryption value to produce a multiplied signal; and
combining said multiplied signal with at least a second signal generated from a second one of said first, second, and third analog input signals to produce
said encrypted analog signal;
wherein said encryption value is a matrix coefficient and wherein said matrix multiplication operation is performed using analog multipliers.

* * * * *

UNITED STATES PATENT AND TRADEMARK OFFICE
CERTIFICATE OF CORRECTION

PATENT NO.         : 6,983,050 B1
APPLICATION NO.    : 09/609019
DATED              : January 3, 2006
INVENTOR(S)        : Yacobi et al.

It is certified that error appears in the above-identified patent and that said Letters Patent is hereby corrected as shown below:

On the title page, item (56), under "Other Publications", in column 2, line 3, after "2000" delete "." and insert -- , --, therefor.

On the title page, item (57), in "Abstract", in column 2, line 2, delete "coping" and insert -- copying --, therefor.

On the title page, item (57), in "Abstract", in column 2, line 13, delete "S" and insert -- B --, therefor.

On the title page, item (57), in "Abstract", in column 2, line 21, delete "constraint" and insert -- constraints --, therefor.

On the title page, item (57), in "Abstract", in column 2, line 22, delete "1399" and insert -- 1394 --, therefor.

On page 2, item (56), under "Other Publications", in column 2, line 1, delete "presentaton" and insert -- presentation --, therefor.

In column 1, line 33, after "distributors" delete ",".

In column 2, line 25, after "Sony" delete ";" and insert -- , --, therefor.

In column 2, line 31, delete "SC" and insert -- 5C --, therefor.

In column 2, line 34, delete "1999" and insert -- 1998 --, therefor.

In column 2, line 46, delete "standard" and insert -- Standard --, therefor.

In column 2, line 58, delete "standard" and insert -- Standard --, therefor.

In column 3, line 65, after "than" insert -- , --.

In column 4, line 44, delete "SUMARY" and insert -- SUMMARY --, therefor.

In column 5, line 5, delete "SC" and insert -- 5C --, therefor.

In column 5, line 15, delete "card in this" and insert -- card. In this --, therefor.

In column 5, line 24, delete "accordance-with" and insert -- accordance with --, therefor.

UNITED STATES PATENT AND TRADEMARK OFFICE
CERTIFICATE OF CORRECTION

PATENT NO. : 6,983,050 B1
APPLICATION NO. : 09/609019
DATED : January 3, 2006
INVENTOR(S) : Yacobi et al.

It is certified that error appears in the above-identified patent and that said Letters Patent is hereby corrected as shown below:

In column 5, line 33, after "source" delete ",".

In column 5, line 36, after "are" delete ",".

In column 7, line 4, after "program" delete ",".

In column 7, line 23, delete "Processing" and insert -- processing --, therefor.

In column 7, line 23, after "221." delete "system" and insert -- System --, therefor.

In column 7, line 27, delete "one" and insert -- only --, therefor.

In column 7, line 29, delete "(BiOS)" and insert -- (BIOS) --, therefor.

In column 7, line 54, delete "disc" and insert -- disk --, therefor.

In column 7, line 61, delete "Scanner" and insert -- scanner --, therefor.

In column 7, line 63, after "unit" insert -- 221 --.

In column 8, line 53, delete "(VSI" and insert -- (VS) --, therefor.

In column 8, line 66, delete "246" and insert -- 248 --, therefor.

In column 9, lines 7–8, delete "the lines" and insert -- PPlines --, therefor.

In column 9, line 35, after "device" delete ",".

In column 9, line 58, delete "cur" and insert -- our --, therefor.

In column 10, line 25, delete "ciphers" and insert -- cipher --, therefor.

In column 11, line 8, delete "scored" and insert -- stored --, therefor.

In column 11, line 23, delete "5" and insert -- B --, therefor.

In column 11, line 54, delete "he" and insert -- be --, therefor.

In column 12, line 7, delete "pseudorandom" and insert -- pseudo-random --, therefor.

UNITED STATES PATENT AND TRADEMARK OFFICE
CERTIFICATE OF CORRECTION

PATENT NO. : 6,983,050 B1
APPLICATION NO. : 09/609019
DATED : January 3, 2006
INVENTOR(S) : Yacobi et al.

It is certified that error appears in the above-identified patent and that said Letters Patent is hereby corrected as shown below:

In column 12, line 25, delete "in" and insert -- In --, therefor.

In column 12, line 26, delete ".(R')," and insert -- (R'), --, therefor.

In column 12, line 40, delete "by" and insert -- $b_n$ --, therefor.

In column 13, line 8, delete "320" and insert -- 310 --, therefor.

In column 13, line 8, delete "anal" and insert -- and --, therefor.

In column 13, line 46, delete "enhancement" and insert -- enhanced --, therefor.

In column 13, line 64, delete "Should" and insert -- should --, therefor.

In column 14, line 10, delete "a is match" and insert -- a mismatch --, therefor.

In column 14, line 14, delete "resynchronization" and insert -- re-synchronization --, therefor.

In column 14, line 22, delete "is" and insert -- as --, therefor.

In column 14, line 50, after "in" insert -- a --.

In column 14, line 59, after "in" delete ".".

In column 14, line 61, delete "Which" and insert -- which --, therefor.

In column 14, line 65, after "and" insert -- display --.

In column 15, line 19, after "signals" delete "of" and insert -- are --, therefor.

In column 15, line 38, after "analog" delete ",".

In column 16, line 53, after "use of" insert -- , --.

In column 17, line 17, after "700" delete ";".

In column 17, line 25, after "operation" delete ".".

UNITED STATES PATENT AND TRADEMARK OFFICE
CERTIFICATE OF CORRECTION

PATENT NO.         : 6,983,050 B1
APPLICATION NO. : 09/609019
DATED                  : January 3, 2006
INVENTOR(S)        : Yacobi et al.

It is certified that error appears in the above-identified patent and that said Letters Patent is hereby corrected as shown below:

In column 18, line 4, after "described" insert -- again --.

In column 18, line 34, delete "manner" and insert -- number --, therefor.

In column 18, line 48, delete "link" and insert -- line --, therefor.

In column 18, line 53, delete "description" and insert -- decryption --, therefor.

In column 18, line 63, delete "K=3" and insert -- k=3 --, therefor.

In column 18, line 64, delete "particulcar" and insert -- particular --, therefor.

In column 20, line 18, after "It will" insert -- also --.

In column 20, line 24, after "embodiments" delete ",".

In column 21, line 10, delete "multiplexer" and insert -- multiplexers --, therefor.

In column 21, line 49, delete "MUXEs" and insert -- MUXES --, therefor.

In column 22, line 12, delete "encrypted" and insert -- encryption --, therefor.

In column 22, line 17, delete "enerating" and insert -- generating --, therefor.

In column 22, line 33, delete "case" and insert -- cases --, therefor.

In column 23, line 5, delete "threebit" and insert -- three bit --, therefor.

In column 23, line 10, after "control" delete ",".

In column 23, line 24, in Claim 1, after "coefficients" insert -- , --.

In column 23, line 30, in Claim 1, delete "B1G" and insert -- b1G --, therefor.

In column 23, line 30, in Claim 1, after "c1B" insert -- , --.

In column 23, line 31, in Claim 1, after "c2B" insert -- , --.

In column 23, line 32, in Claim 1, after "c3B" insert -- ; --.

UNITED STATES PATENT AND TRADEMARK OFFICE
CERTIFICATE OF CORRECTION

PATENT NO. : 6,983,050 B1
APPLICATION NO. : 09/609019
DATED : January 3, 2006
INVENTOR(S) : Yacobi et al.

It is certified that error appears in the above-identified patent and that said Letters Patent is hereby corrected as shown below:

In column 23, line 51, in Claim 2, delete "multiplications" and insert -- multiplication --, therefor.

In column 23, line 54, in Claim 2, after "first" insert -- , --.

In column 24, line 19, in Claim 6, after "first" insert -- , --.

In column 24, line 21, in Claim 7, after "first" insert -- , --.

In column 24, line 34, in Claim 9, delete "includes" and insert -- include --, therefor.

In column 24, line 41, in Claim 9, delete "Second" and insert -- second --, therefor.

In column 24, line 49, in Claim 11, after "comparing" delete ",".

In column 24, line 63, in Claim 12, delete "Second" and insert -- second --, therefor.

In column 24, line 67, in Claim 12, delete "Values" and insert -- values --, therefor.

In column 25, line 6, in Claim 13, delete "ere" and insert -- are --, therefor.

Signed and Sealed this

First Day of September, 2009

David J. Kappos
*Director of the United States Patent and Trademark Office*